(12) United States Patent
Niemann

(10) Patent No.: US 11,430,023 B2
(45) Date of Patent: Aug. 30, 2022

(54) INTEGRATED CUSTOMER SUPPORT SYSTEM FOR FIELD-CENTRIC BUSINESS SECTORS

(71) Applicant: AgriSync, Inc, Waukee, IA (US)

(72) Inventor: Casey Niemann, Dallas Center, IA (US)

(73) Assignee: AGRISYNC, INC., Dallas Center, IA (US)

( * ) Notice: Subject to any disclaimer, the term of this patent is extended or adjusted under 35 U.S.C. 154(b) by 264 days.

(21) Appl. No.: 16/563,497

(22) Filed: Sep. 6, 2019

(65) Prior Publication Data

US 2019/0392491 A1    Dec. 26, 2019

Related U.S. Application Data

(63) Continuation-in-part of application No. 15/259,570, filed on Sep. 8, 2016, now abandoned.
(Continued)

(51) Int. Cl.
    G06Q 30/02    (2012.01)
    H04M 3/51    (2006.01)
    (Continued)

(52) U.S. Cl.
    CPC ....... *G06Q 30/0281* (2013.01); *G06Q 30/016* (2013.01); *G06Q 50/02* (2013.01);
    (Continued)

(58) Field of Classification Search
    None
    See application file for complete search history.

(56) References Cited

U.S. PATENT DOCUMENTS

| 5,862,223 A | 1/1999 | Walker et al. |
| 6,687,241 B1 * | 2/2004 | Goss ............... H04M 7/003 370/352 |

(Continued)

FOREIGN PATENT DOCUMENTS

| CN | 101894320 A | 11/2010 |
| CN | 104618800 A | 5/2015 |

OTHER PUBLICATIONS

Channe et al., Multidisciplinary Model for Smart Agriculautre using Internet-of-Things (IoT), Sensors, Cloud-Computing, Mobile Computing & Big Data Analysis Jun. 2015 <https://pdfs.semanticscholar.org/e914/d4315s0f4cb60b9d80b123f7d43782c1aba8.pdf> (Year: 2015).

(Continued)

*Primary Examiner* — Quoc D Tran
(74) *Attorney, Agent, or Firm* — Michael Best & Friedrich LLP

(57) ABSTRACT

A computer network, including at least one server computer having a non-transitory computer readable medium programmed to connect customers needing product or service support with an advisor. Each advisor has a device programmed to interface with the at least one server computer. Then at least one server computer includes a database of registered advisors and a database of active customers. Then at least one server computer is programmed to initiate a customer service session upon receiving a request from a first customer computing device. A telecommunications system that connects customers to advisors that includes voice, video, and text, ticket submission that interacts with the computer network to create support tickets and provides call tracking features. A method allows advisor managers to create teams of advisors, create a custom greeting for the team, create ring schedules for team members, and share the team phone number with customers via text message.

20 Claims, 33 Drawing Sheets

Related U.S. Application Data

(60) Provisional application No. 62/215,487, filed on Sep. 8, 2015.

(51) Int. Cl.
   *G06Q 30/00* (2012.01)
   *G06Q 50/02* (2012.01)
   *H04M 3/53* (2006.01)

(52) U.S. Cl.
   CPC ....... *H04M 3/5141* (2013.01); *H04M 3/5315* (2013.01); *H04M 3/5322* (2013.01)

(56) References Cited

U.S. PATENT DOCUMENTS

| | | | |
|---|---|---|---|
| 7,890,405 B1 | 2/2011 | Robb | |
| 7,990,882 B1* | 8/2011 | Bedair | H04L 65/80 370/468 |
| 2003/0126205 A1* | 7/2003 | Lurie | G06Q 30/0282 709/204 |
| 2009/0168989 A1* | 7/2009 | Perlmutter | H04M 3/5183 379/265.09 |
| 2010/0035597 A1 | 2/2010 | Rao | |
| 2010/0109946 A1 | 5/2010 | Pande | |
| 2010/0281364 A1 | 11/2010 | Sidman | |
| 2011/0040592 A1 | 2/2011 | Kurtzig et al. | |
| 2011/0246308 A1* | 10/2011 | Segall | G06Q 10/109 705/14.66 |
| 2011/0276447 A1* | 11/2011 | Paul | G06Q 30/04 705/34 |
| 2012/0046837 A1 | 2/2012 | Anderson | |
| 2012/0114187 A1 | 5/2012 | Duarte | |
| 2013/0111316 A1 | 5/2013 | Miller et al. | |
| 2014/0324757 A1 | 10/2014 | Tabrizi et al. | |
| 2015/0036814 A1 | 2/2015 | Buckner et al. | |
| 2016/0232671 A1 | 8/2016 | Ur et al. | |
| 2016/0301771 A1* | 10/2016 | Choudhari | H04L 67/42 |
| 2016/0371276 A1* | 12/2016 | Furtado | G06F 16/24578 |
| 2017/0032258 A1 | 2/2017 | Miresmailli et al. | |
| 2017/0318157 A1* | 11/2017 | Shore | H04M 3/523 |
| 2018/0309801 A1* | 10/2018 | Rathod | H04L 67/141 |

OTHER PUBLICATIONS

PCT International Search Report and Written Opinion dated Dec. 8, 2020 for related International Application No. PCT/US2020/049122, 11 pages.

* cited by examiner

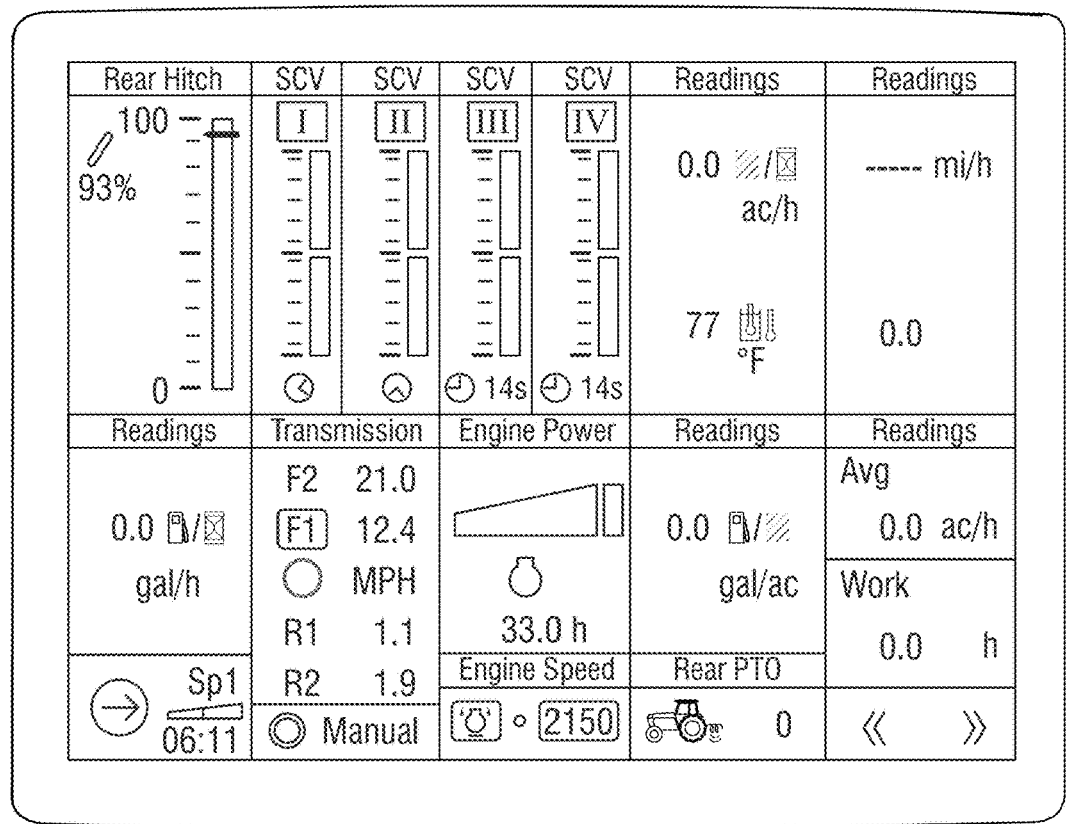
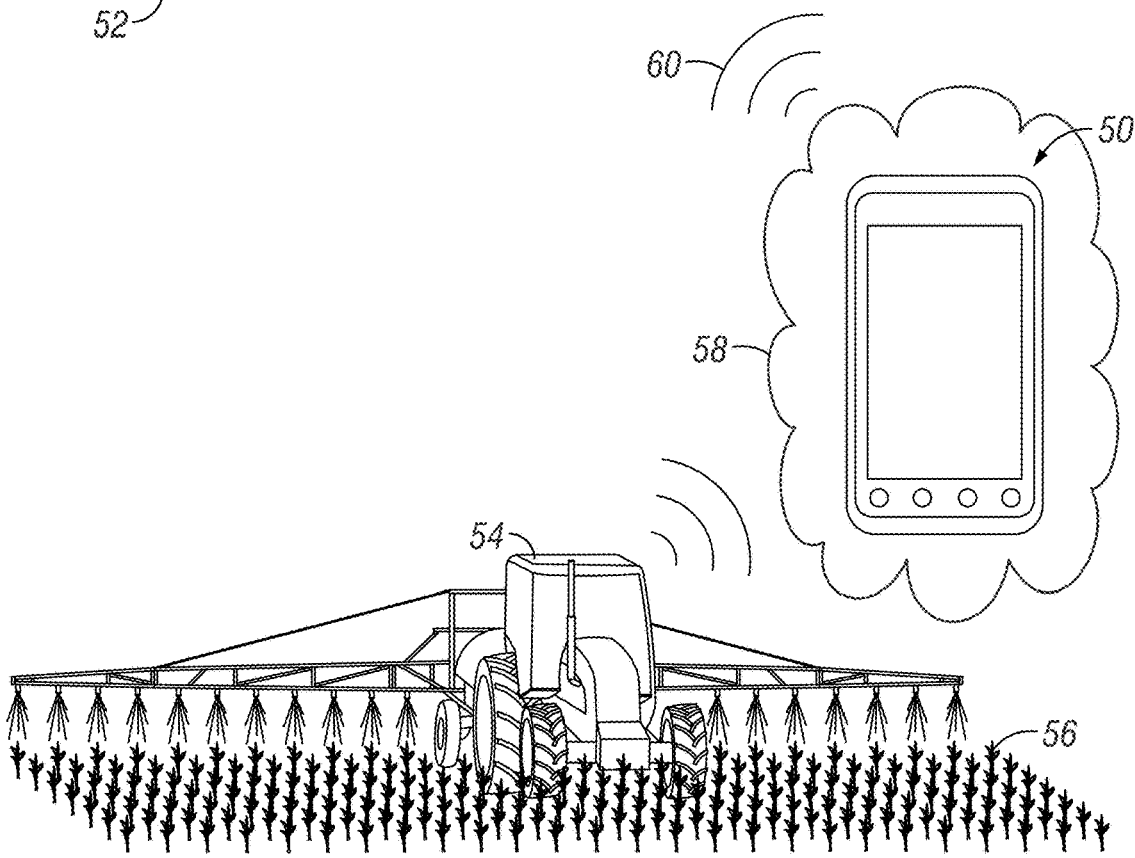
FIG. 1

NETWORK  TICKETS  MANAGE  HELP     Get Started-Guide | Share Dashboard | Marketing Toolkit

Company Tickets

Create Team                                    Invite Internal Advisor

[Change] [Gallery] [Clear]           (5)    (5)    (0)    (0)
                                     Total  Filled Pending Open
                                     Advisor Seats Name*                                Mobile Number*
Precision                            e.g. 201-555-0123

Select Advisors                      Work Email*
[○ Advisor 1 ×] [○ Advisor 2 ×] [○ Advisor 3 ×]    e.g. johnsmith@acme.com Description                          Add to teams (optional)
e.g. Customer success team           e.g. Customer success team ☐ Show to internal employees only    ☐ Enable Network VoiceHub
Learn about internal team            Learn about VoiceHub

[CREATE] [CLEAR]                     [SEND] [CLEAR]

*FIG. 23*

NETWORK  TICKETS  MANAGE  HELP

○ Advisor 1 ✗ | ○ Advisor 2 ✗ | ○ Advisor 3 ✗ |

Description
e.g. Customer success team e.g. johnsmith@acme.com

Add to teams (optional)
e.g. One or more teams

☐ Show to internal employees only
Learn about internal team

☐ Enable Network VoiceHub
Learn about VoiceHub

[ CREATE ]  [ CLEAR ]

[ SEND ]  [ CLEAR ]

Teams

Select item below for options

| Name | Description | VoiceHub Number | Ring Schedule | Is Internal | Visibility |
|---|---|---|---|---|---|
| ˅ ○ Precision | | +12015550123 | Yes | No | Visable |

Select item below for options

| Name | Mobile Number | eMail | | Role | Visibility |
|---|---|---|---|---|---|
| ○ John Doe | +12015550123 | johndoe@network.com | | Admin | Visable |

Custom VoiceHub Greeting

| WELCOME GREETING | LEAVE MESSAGE | AFTER HOURS |
|---|---|---|

How to handle incoming calls during business hours.

☐ △ ↻       00:15 / 00:00

Maximum messages recording duration: 15 Sec

Speak these words "Thanks for calling ACME. Please standby for an expert advisor."

[ SAVE AND UPDATE ]

| EDIT MEMBERS | ✎ GREETING | ✎ RING SCHEDULE | ⁂ SHARE NUMBER | ◂ SHOW/HIDE | ◂ REMOVE HOTLINE | ✕ REMOVE TEAM |
|---|---|---|---|---|---|---|
| | | Ring Schedule | | Is Internal? | Visibility | |
| | | YES | | NO | Visible | |

FIG. 28

Ring Schedule

Business Hours Ring Schedule (Mon-Fri):     ON

| Start | 8:00 AM | End | 5:00 PM |

Select Advisors

[ ○ Advisor 1 ✕ ]

Evening Hours Ring Schedule (Mon-Fri):     OFF

| Start | 8:00 AM | End | |

Select Advisors

[ e.g. One or more advisor ]

Weekend Hours Ring Schedule (Sat):     OFF

| Start | 8:00 AM | End | |

Select Advisors

[ e.g. One or more advisor ]

[ Advisor/Farmer ]  Dashboard Only

Sign-In
Use your mobile number / code to sign in

*Mobile Number 201-555-XXXX                                    [ Trust Me ]

*Verification Code

*****

Remember Me?
Note: If checked, will not ask verification code for next 30 days.

[ Sign-in ]

*Verification Code sent successfully!

Not registered yet? Click here to sign-up and get started

ⓘ Please note!

We will text you a 4 digit single-use code to sign in. You don't have to remember this code. We will send you a new text code each time you log in on the web or mobile app. No password to remember...or forget.

*FIG. 32*

| Ticket | Description | Status | Call Duration | Client Name | Created Date | Feedback | Billable | Escalate | Service Plan |
|---|---|---|---|---|---|---|---|---|---|
| 85044 | Gen 4 | ASSIGNED | 00:00:58 | Farmer Gary | 4/10/2018 | 5 | YES | NO | NO |
| 83473 | Voice Ticket | ASSIGNED | 00:10:22 | Farmer Bob | 4/10/2018 | 4 | YES | NO | NO |
| 8620F | Grey Leaf Spot | CLOSED | 00:00:07 | Farmer Jim | 4/10/2018 | 4 | NO | NO | NO |
| 8B1F3 | Voice Ticket | ASSIGNED | 00:03:28 | Farmer Gary | 4/10/2018 | 4 | NO | NO | NO |
| 8D3D2 | AgLeader | ASSIGNED | 00:05:00 | Farmer Bob | 4/10/2018 | 4 | NO | NO | YES |
| 875C4 | Instant Ticket | ASSIGNED | 00:00:32 | Farmer Jim | 4/10/2018 | 4 | NO | NO | NO |
| 8ACE6 | Welcome to Network | CLOSED | 00:00:14 | Farmer Gary | 4/10/2018 | 4 | NO | YES | NO |
| 869DC | Welcome to Network | ASSIGNED | No Session | Farmer Bob | 4/10/2018 | 4 | NO | NO | NO |
| 8EA4D | 2020 | ASSIGNED | No Session | Farmer Jim | 4/10/2018 | 4 | NO | NO | NO |
| 8AF91 | Instant Ticket | ASSIGNED | 00:07:04 | Farmer Gary | 4/10/2018 | 4 | NO | NO | NO |
| 8C889 | Welcome to Network | ASSIGNED | 00:00:54 | Farmer Bob | 4/10/2018 | 4 | NO | NO | YES |
| 8917A | Instant Ticket | ASSIGNED | No Session | Farmer Jim | 4/10/2018 | 4 | NO | NO | NO |
| 81F34 | Instant Ticket | ASSIGNED | No Session | Farmer Gary | 4/10/2018 | 4 | NO | NO | NO |
| 8472F | Voice Ticket | ASSIGNED | No Session | Farmer Bob | 4/10/2018 | 4 | NO | NO | NO |
| 82BA1 | 2020 | ASSIGNED | No Session | Farmer Jim | 4/10/2018 | 4 | NO | NO | NO |
| 80D49 | 2020 | ASSIGNED | 00:00:37 | Farm 6003 | 4/10/2018 | 4 | NO | NO | YES |
| 8444C | Welcome to Network | ASSIGNED | No Session | Unknown | 4/10/2018 | 4 | NO | NO | NO |

FIG. 33

INTEGRATED CUSTOMER SUPPORT SYSTEM FOR FIELD-CENTRIC BUSINESS SECTORS

CROSS REFERENCE TO RELATED APPLICATIONS

This application is a continuation-in-part application and claims priority under 35 U.S.C. § 119 to application U.S. Ser. No. 15/259,570, entitled Vertically Integrated Agricultural Advisor Network and filed on Sep. 8, 2016, which claims priority to provisional application U.S. Ser. No. 62/215,487 filed on Sep. 8, 2015. These patent applications are herein incorporated by reference in their entirety, including without limitation, the specification, claims, and abstract, as well as any figures, tables, drawings, or appendices thereof.

FIELD OF INVENTION

This invention relates generally to computer implemented consumer advisory networks, and more particularly to a system and method for connecting service or product providers with their customers.

BACKGROUND OF THE INVENTION

Customers in field-centric business sectors such as farming, construction, animal production and others need high quality, efficient communication with their service and product suppliers to fix problems and make decisions. Staying organized in a desk-less work environment, whether as a customer or a service provider, is a significant challenge. And the new, complex systems and innovations emerging in field-centric business sectors only compound the challenge. Precision farming systems, sophisticated seed and crop prescriptions, field analysis tools, equipment telematics, and advanced marketing techniques are examples of these new and complex systems and innovations. These systems and others bring new interfaces, multi-step set ups, and complex diagnostics, creating constant and complex user challenges. Even the most astute customers struggle to make sense of all the "tools" and "solutions" and are constantly looking for the right support from their suppliers with adoption, support and decision making. Suppliers in turn struggle to effectively support their customers in a timely, effective and economical manner.

Thus, there is a need for an intermediary tool to simplify the support and communication between customers and their service and product suppliers—especially in field-centric business sectors—that includes customizable communication methods without the need for expensive hardware or IT support. The ideal solution will simplify support, allow service and product suppliers to scale their subject matter experts appropriately, and improve customer satisfaction.

SUMMARY OF THE INVENTION

Therefore, it is a primary object, feature, or advantage of the present invention to improve on or overcome the deficiencies in the art.

It is another object, feature, or advantage of the present invention to enable service and product suppliers in field-centric business sectors to more effectively communicate with and support their customers.

It is another object, feature, or advantage of the present invention to improve horizontal [not sector specific] support models that lack natural user interface, video sharing, and ability to work across a complex and loosely coupled channel of customers, local advisors, service provider/dealers and basic manufacturer or technology providers.

It is another object, feature, or advantage of the present invention to provide the ability to bring a video first perspective and visual interpretation for solving issues in a real time manner that connects remote customer needs directly with domain subject matter experts.

It is another object, feature, or advantage of the present invention to provide the ability for customer support learning to be shared, measured, and improved through a process of monitoring and metric benchmarking.

It is another object, feature, or advantage of the present invention to provide a telecommunications system capable of interacting with the computer network to improve communication between domain subject matter experts and remote customers by increasing responsiveness and allowing for advisor mobility without any hardware installation or IT help.

It is another object, feature, or advantage of the present invention to provide the ability to connect domain subject matter experts with remote customers in a customizable manner.

It is another object, feature, or advantage of the present invention to provide the ability to work across separate entities to collaborate, escalate, and resolve issues.

It is another object, feature, or advantage of the present invention to increase engagement and reduce travel.

It is another object, feature, or advantage of the present invention to measure customer service satisfaction.

It is another object, feature, or advantage of the present invention to improve speed to resolution.

It is another object, feature, or advantage of the present invention to improve the safety of customers and service and product suppliers in the field.

It is another object, feature, or advantage of the present invention to provide an application that is cost-effective.

It is another object, feature, or advantage of the present invention to provide an application that is easy and intuitive to use.

It is another object, feature, or advantage of the present invention to provide an application that has graphical user interfaces that are aesthetically pleasing.

According to some aspects of the disclosure, a computer network for connecting an customer needing problem resolution and decision support with a advisor includes at least one server computer having non-transitory computer readable medium, a customer computing device that includes an application to interface with the at least one server computer, an advisor computing device that is programmed to interface with the at least one server computer, and a telecommunications system that allows voice to ticket, voicemail submission and application, text message alerts, and call tracking. The non-transitory computer readable medium includes a database of registered advisors and advisor teams with contact information and skills and a database of active customers with contact information. The at least one server computer is programmed to initiate a customer service session upon receiving a request from the customer computing device. The customer computing device is programmed to provide identifying information identifying a first customer and a requested advisor or team of advisors selected from a plurality of advisors and teams of advisors in the request. The at least one server computer is programmed to send the request to the requested advisor or team of advisors and provide a communication interface between the first customer and the requested advisor or team of advisors during the customer service session, whereby the first customer and the requested advisor or team of advisors can communicate with each other. The voice to ticket allows a customer to contact multiple advisors within a team of advisors simultaneously with a single phone call. A submitted voicemail message is stored in a group mailbox and interacts with the computer network to seamlessly create a support ticket. A text message is sent to the customer and any advisors associated with the advisor team mailbox when a voicemail is submitted alerting the customer and the advisors associated with the advisor team mailbox that a support ticket has been created. The call tracking allows advisors to automatically track phone time.

According to additional aspects of the disclosure, the customer's computing device is programmed to record video and audio data and provide the video and audio data to the at least one server computer, and the at least one server computer is programmed to transmit the video and audio data to the requested advisor computing device during the customer service session.

According to additional aspects of the disclosure, the advisor's computing device displays a dashboard with information current and past customer service sessions and relevant customers.

According to additional aspects of the disclosure, the customer's computing device displays a dashboard with information about current and past customer service session requests as well as relevant advisors and allows a customer to request a customer service session.

According to additional aspects of the disclosure, the customer's identifying information includes identity, contact information, location, and access method.

According to additional aspects of the disclosure, the computer network uses a cloud-based software as a service (SaaS) model.

According to additional aspects of the disclosure, at least one server computer is programmed to provide a selection interface to the customer computing device to aid in a selection of an appropriate registered advisor or team of advisors as the requested advisor or team of advisors based on the first customer's current issue.

According to additional aspects of the disclosure, the customer computing device is a smart phone, tablet, or personal computer and the advisor computing device is a smart phone, tablet, or personal computer.

According to other aspects of the disclosure, a method of connecting customers needing technological support with advisors capable of providing technological support includes providing an application in which a user may identify as a customer or advisor, allowing a customer to create a support ticket request by selecting a requested advisor or team of advisors from a database of registered advisors with contact information and skills located on at least one server computer having a non-transitory computer readable medium, notifying the requested advisor that the requested advisor or team of advisors has been selected by the customer, permitting communication between the customer and requested advisor, and allowing advisor managers to control the manner in which advisors communicate with customers wherein an advisor manager can create teams of advisors where a single phone number exists for the team, an advisor manager can create custom greetings for the team, an advisor manager can create custom ring schedules for advisors, and advisors can share the team phone number with customers via a text message.

According to additional aspects of the disclosure, a selection interface aids the customers in selecting an advisor based on the advisor's service category as well as issues facing the customers and the customers' proximity to the advisor.

According to additional aspects of the disclosure, including inputting a description of an issue needing to be resolved by an advisor.

According to additional aspects of the disclosure, the description includes the urgency of the issue.

According to additional aspects of the disclosure, the method is executed through a cloud-based software as a service (SaaS) model.

According to additional aspects of the disclosure, the method includes transmitting audio and video communication between the customer and requested advisor.

According to additional aspects of the disclosure, the method includes recording communication between the customer and requested advisor.

According to additional aspects of the disclosure, a customer can add an advisor to the database of registered advisors by inviting an advisor from the customer's list of contacts, by adding an advisor from a network directory of existing advisors based on service category and proximity, or by inviting an advisor by entering the advisor's mobile phone number.

According to additional aspects of the disclosure, video and photos may be added to the support ticket request.

According to additional aspects of the disclosure, the method includes permitting the requested advisor to suggest times to communicate with the customer.

According to additional aspects of the disclosure, the method includes allowing the customer and advisor to provide feedback regarding the service session.

According to other aspects of the disclosure, a method of connecting advisors capable of providing technological support with customers needing technological support includes providing an application in which a user may identify as a customer or advisor, allowing an advisor to solicit a customer from a database of active customers with contact information located on at least one server computer having a non-transitory computer readable medium, notifying the active customer that the active customer has been solicited by the advisor, and permitting communication between the advisor and the active customer.

BRIEF DESCRIPTION OF THE DRAWINGS

FIG. 1 is an abstract view illustrating a mobile application to interface with at least one server computer through a computer network.

FIG. 23 is an exemplary view showing the ability to create teams of advisors.

FIG. 24 is an exemplary view illustrating a company dashboard.

FIG. 28 is an exemplary view illustrating the ability to create a custom greeting for a team of advisors.

FIG. 29 is an exemplary view illustrating the ring schedule feature.

FIG. 30 is an exemplary view illustrating the ability to share a team phone number with customers via text message.

FIG. 32 is an exemplary view illustrating mobile phone authentication when a user logs into a browser.

FIG. 33 is an exemplary view showing an example of a spreadsheet containing call tracking information.

DETAILED DESCRIPTION

Figure 2:
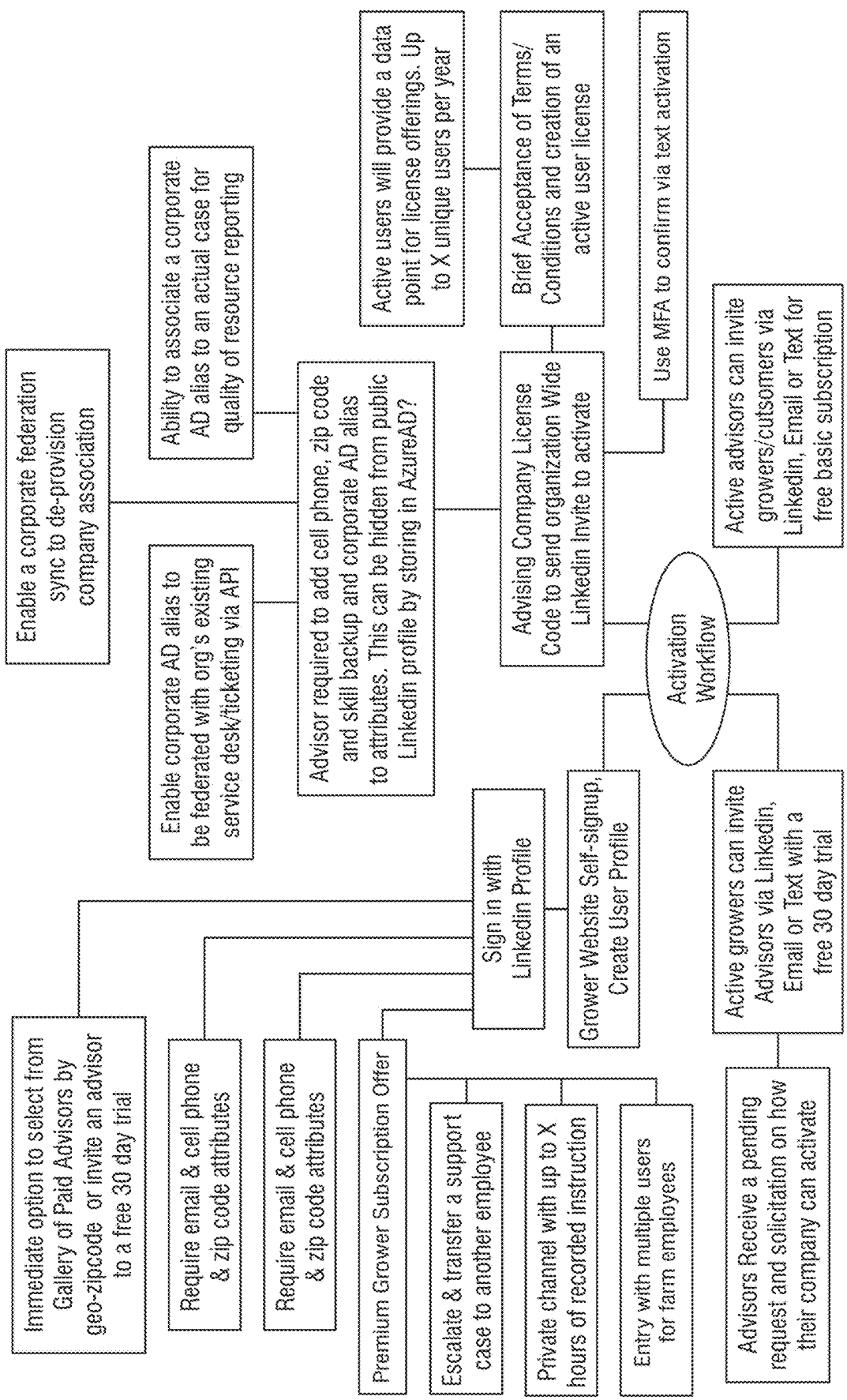
FIG. 2 is a high-level diagram illustrating the activation workflow.

The following definitions and introductory matters are provided to facilitate an understanding of the present invention. Unless defined otherwise, all technical and scientific terms used herein have the same meaning as commonly understood by one of ordinary skill in the art to which embodiments of the present invention pertain.

The terms "a," "an," and "the" include plural referents unless context clearly indicates otherwise. Similarly, the word "or" is intended to include "and" unless context clearly indicate otherwise. The word "or" means any one member of a particular list and also includes any combination of members of that list.

The terms "invention" or "present invention" as used herein are not intended to refer to any single embodiment of the particular invention but encompass all possible embodiments as described in the specification and the claims.

The term "about" as used herein refers to variation in the numerical quantities that can occur, for example, through typical measuring techniques and equipment, with respect to any quantifiable variable, including, but not limited to, mass, volume, time, distance, wave length, frequency, voltage, current, and electromagnetic field. Further, given solid and liquid handling procedures used in the real world, there is certain inadvertent error and variation that is likely through differences in the manufacture, source, or purity of the ingredients used to make the compositions or carry out the methods and the like. The claims include equivalents to the quantities whether or not modified by the term "about."

The term "configured" describes an apparatus, system, or other structure that is constructed or configured to perform a particular task or to adopt a particular configuration. The term "configured" can be used interchangeably with other similar phrases such as constructed, arranged, adapted, manufactured, and the like.

Terms such as first, second, vertical, horizontal, top, bottom, upper, lower, front, rear, end, sides, concave, convex, and the like, are referenced according to the views presented. These terms are used only for purposes of description and are not limiting. Orientation of an object or a combination of objects may change without departing from the scope of the invention.

The apparatuses, systems, and methods of the present invention may comprise, consist essentially of, or consist of the components of the present invention described herein. The term "consisting essentially of" means that the apparatuses, systems, and methods may include additional components or steps, but only if the additional components or steps do not materially alter the basic and novel characteristics of the claimed apparatuses, systems, and methods.

The following embodiments are described in sufficient detail to enable those skilled in the art to practice the invention however other embodiments may be utilized. Mechanical, procedural, and other changes may be made without departing from the spirit and scope of the invention. Accordingly, the scope of the invention is defined only by the appended claims, along with the full scope of equivalents to which such claims are entitled.

The present invention improves upon the art because it works across several mobile devices 50, browsers, and wearable devices; enables collaboration without plug-ins or $3^{rd}$ party installation; enables discovery, participation, and collaboration within an agricultural vertical network of resources; works across multiple channel providers from a customer, local advisor, service provider or dealer to basic manufacturer or technology provider; and may have a single application provide access to multiple advisors, organized by specialty.

Agricultural operations are complex and maximizing profits and yield requires equipment optimization, mapping interpretation, agronomy support, in cab diagnostics, and UAV and remote sensing.

FIG. 1 exemplifies a mobile application interface 52 on a mobile device 50 to interface with the at least one server computer through a cloud-based software as a service model 58. Data with the health and status of crops 56 is received from agricultural equipment 54, such as agricultural implements and sensors, via communications 60 sent through the cloud-based software as a service model 58.

Figure 3:
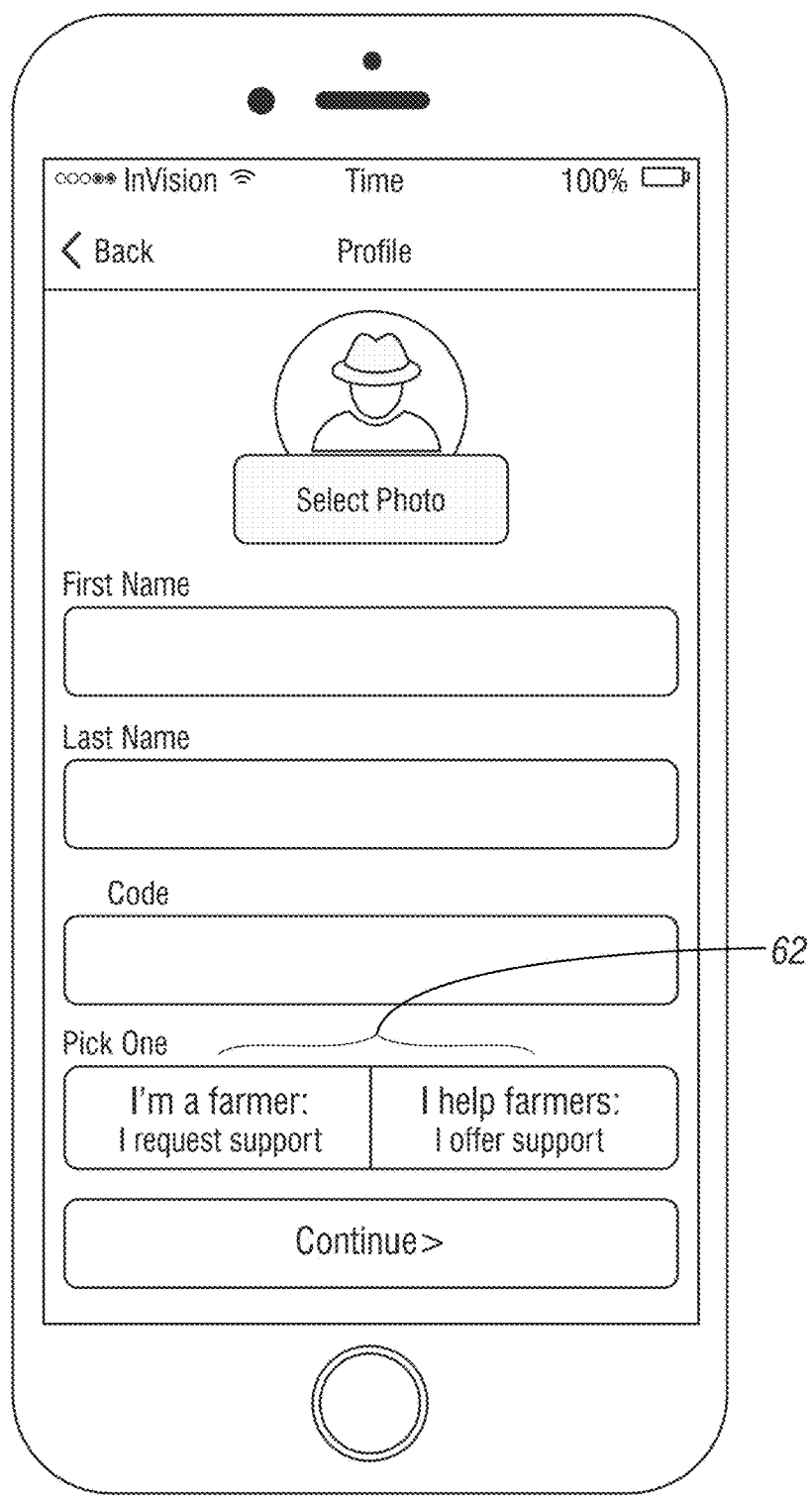
FIG. 3 is an exemplary view showing a user having the ability to create a profile as either a customer or an advisor.
Figure 4:
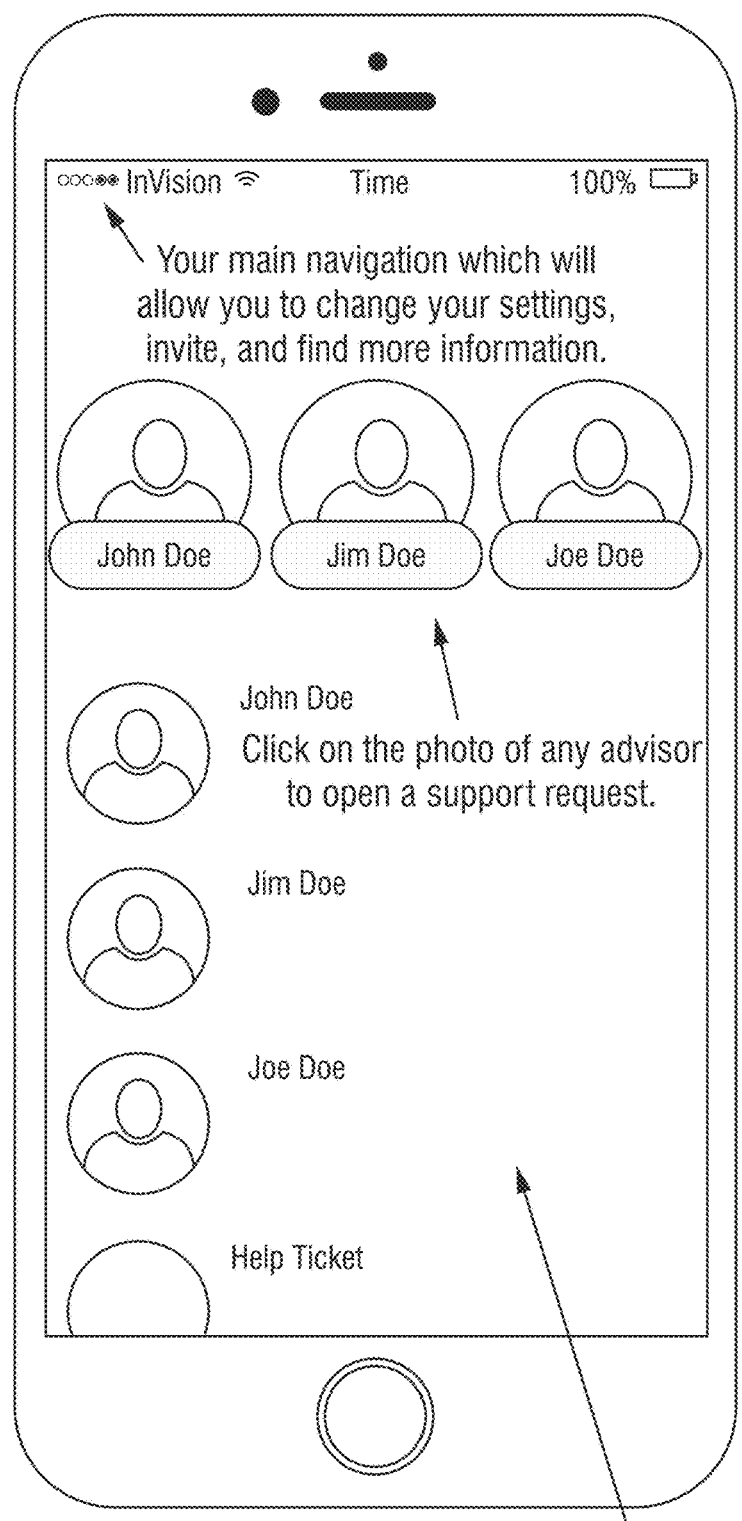
FIG. 4 is an explanatory diagram illustrating the typical user interface displayed on a user's dashboard.

This type of service innovation has resulted in reduced downtime, return on investment in technology, reduced cost of service, and scale expertise. The mobile application interface 52 is simple to use, simple to share, and contains two types of profiles 62: (1) a network of expert advisors from multiple different companies and (2) customers or customers who can request help. FIG. 3 illustrates an exemplary view of a user having the ability to create a profile as either a customer or an advisor. FIG. 4 illustrates that typically, the mobile application interface 52 includes at least a navigation menu, recent trusted contacts, and recent tickets. A dashboard includes one touch access to remote advisors and all service items in one simplified view.

Figure 5:
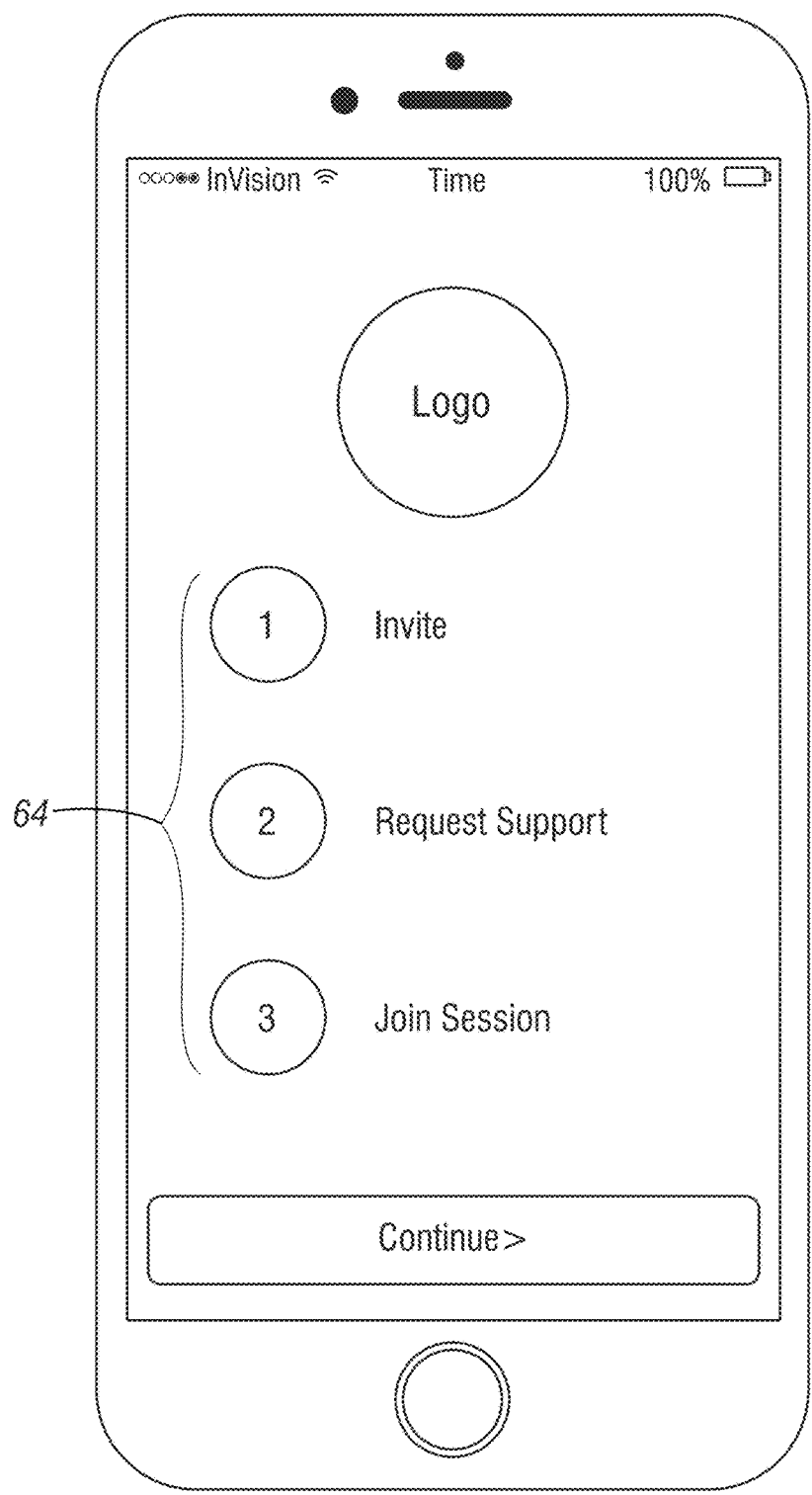
FIG. 5 is an exemplary view illustrating the three-step tutorial provided to users.
Figure 6:
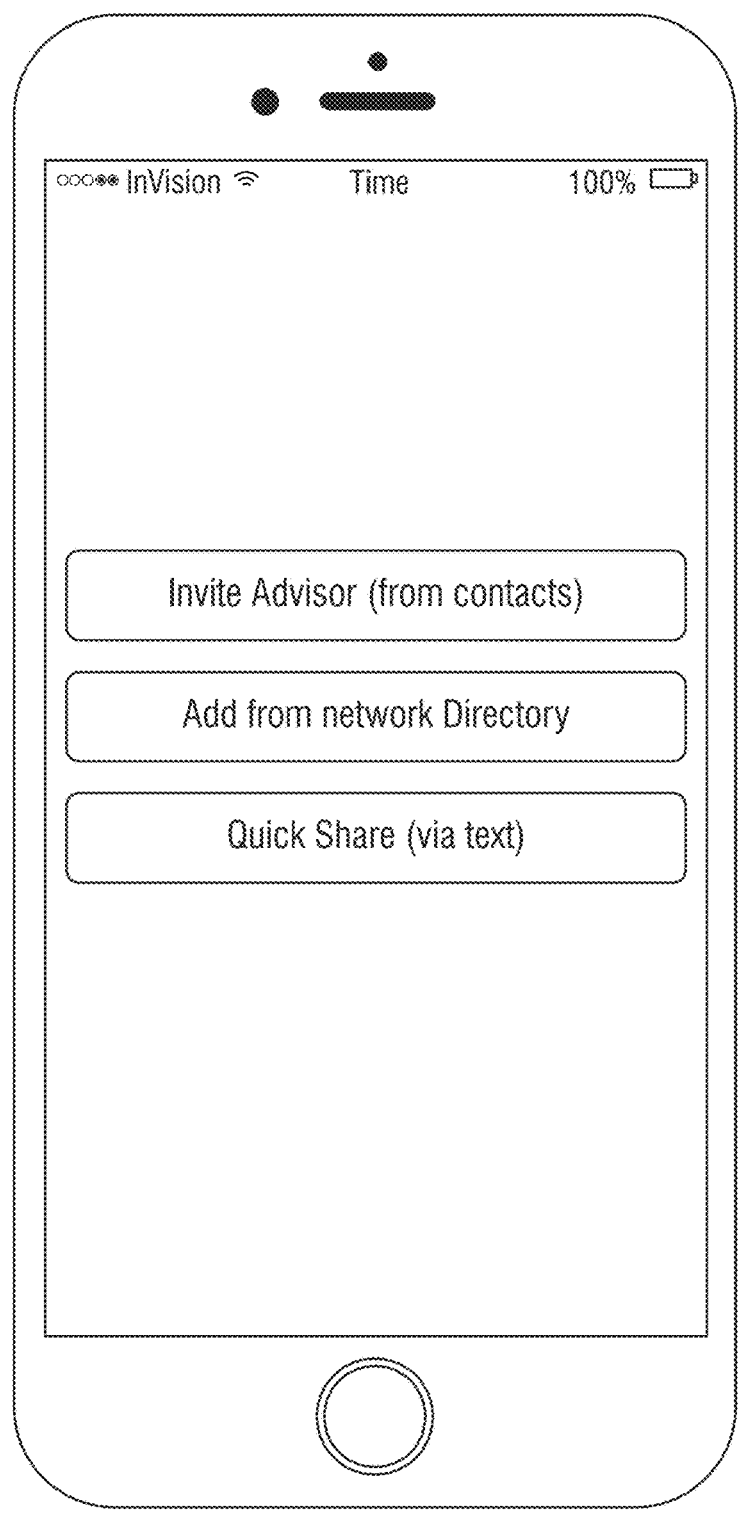
FIG. 6 is an exemplary view illustrating the ability for customers to find and connect with advisors.
Figure 7:
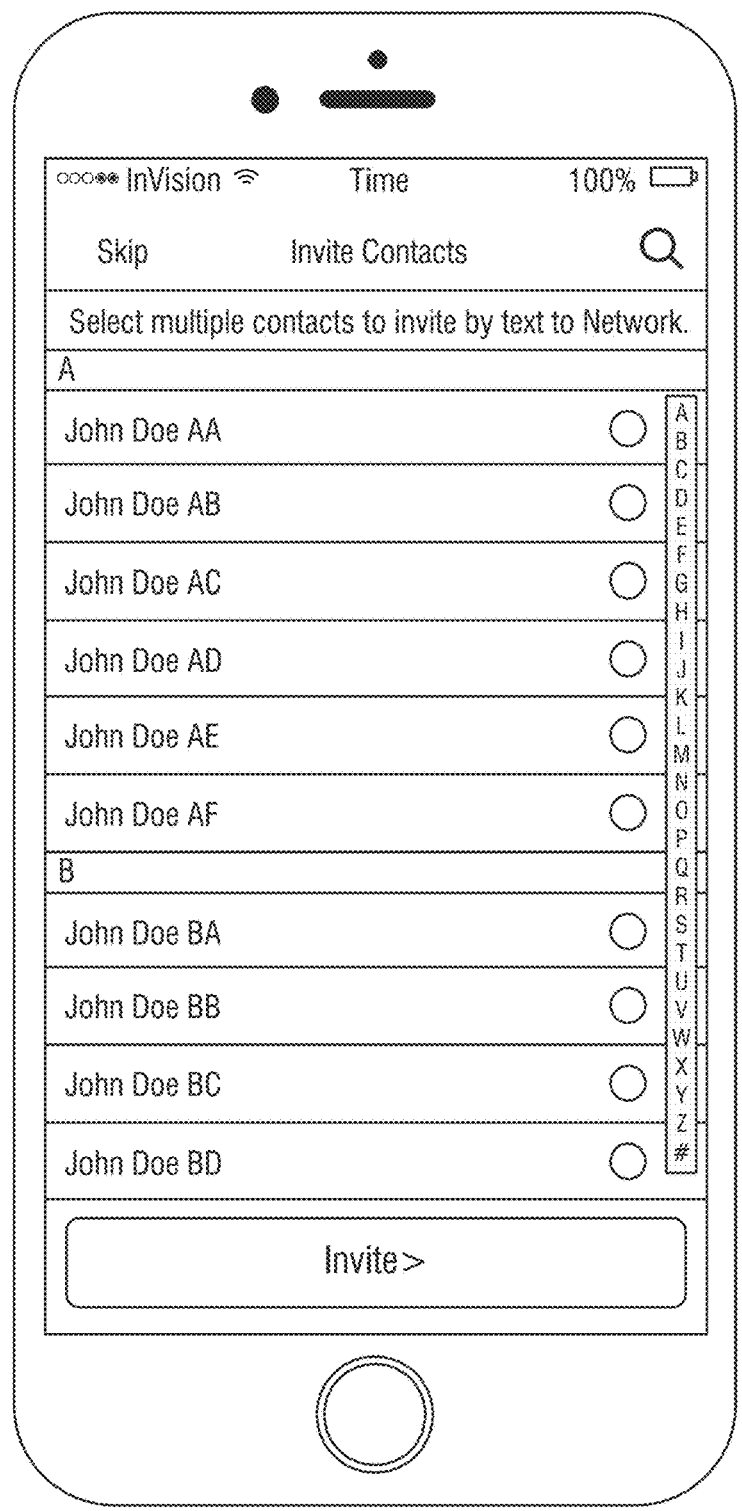
FIG. 7 is an exemplary view of a user's contact list illustrating that a user can invite others to join the network directly from their contacts list with a one-click text.
Figure 8:
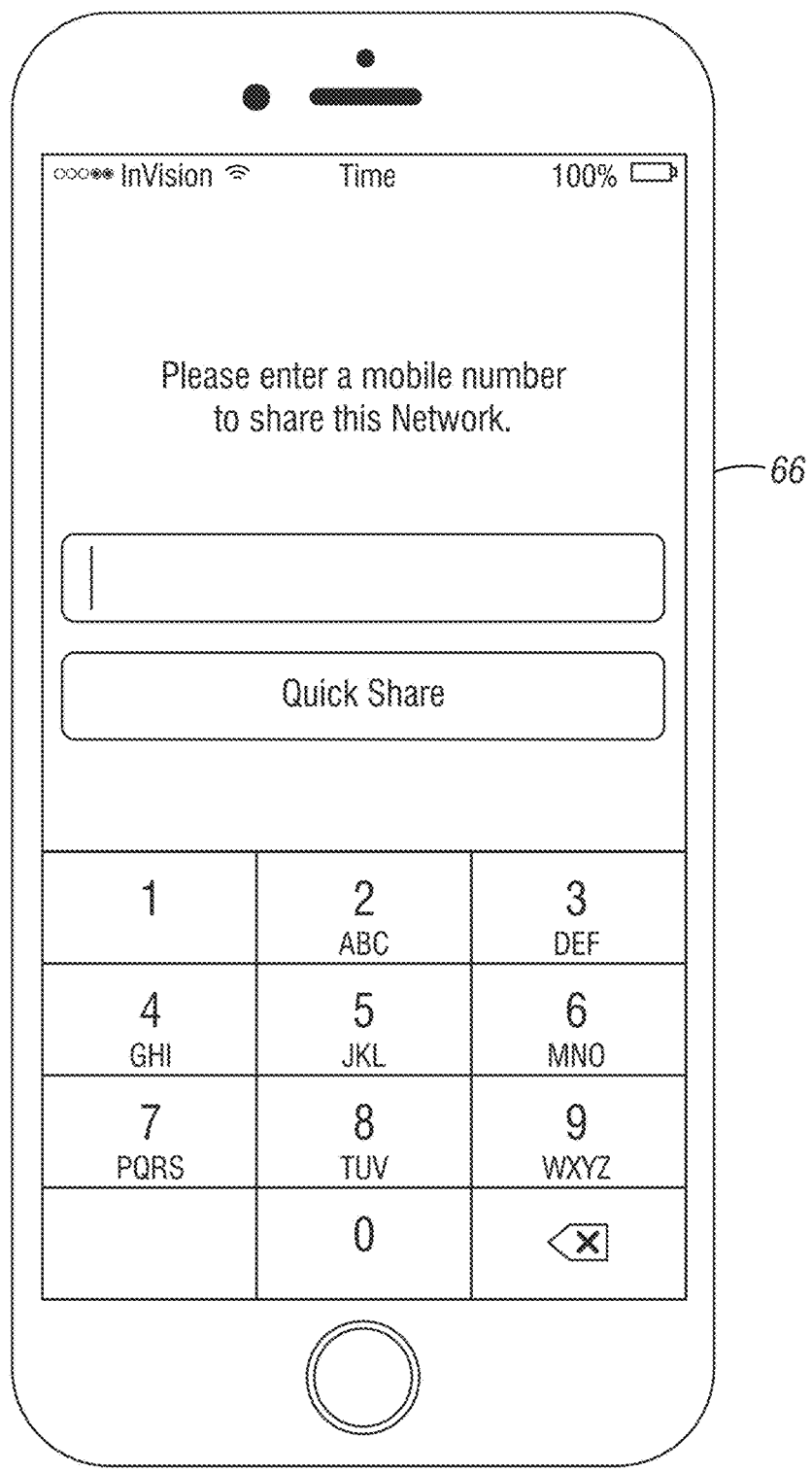
FIG. 8 is an exemplary view illustrating the ability to invite others to join the network be entering their mobile phone number.

FIG. 5 shows the initial screen that leads to a simple three-step tutorial 64 that is included in the mobile application 52 that teaches users how to invite advisors and customers or customers, how to request or offer help, and how to join live support sessions. Connecting advisors and customers may be accomplished by syncing the mobile application with a customer's contacts, by selecting from a network directory of existing advisors, or by quickly sharing contact information directly from one phone to another. FIG. 6 illustrates these three ways of connecting customers with advisors. Contacts from a customer's phonebook may be invited to join the network with a one-click text invite, illustrated by FIG. 7. A customer can find an advisor on a network directory of existing advisors based on service category and proximity. A customer or advisor can invite others to join the network by simply entering a mobile phone number of the person to be invited ("quick share" 66). FIG. 8 illustrates the quick share 66 feature.

FIG. 2 shows several ways in which an account may be activated in more detail.

For example, active advisors may invite customers or customers via LinkedIn, email, or text for a free basic subscription.

Active customers may invite advisors via LinkedIn, email, or text with a free 30 day trial. The advisor then receives a pending request and solicitation on how their company can activate. Customers also have the option to participate in the Premium Customer Subscription. This subscription provides the ability to escalate and transfer a support case to another employee, provides a private channel with hours of recorded instruction, and provides the ability for entry with multiple users for farm employees.

Figure 9:
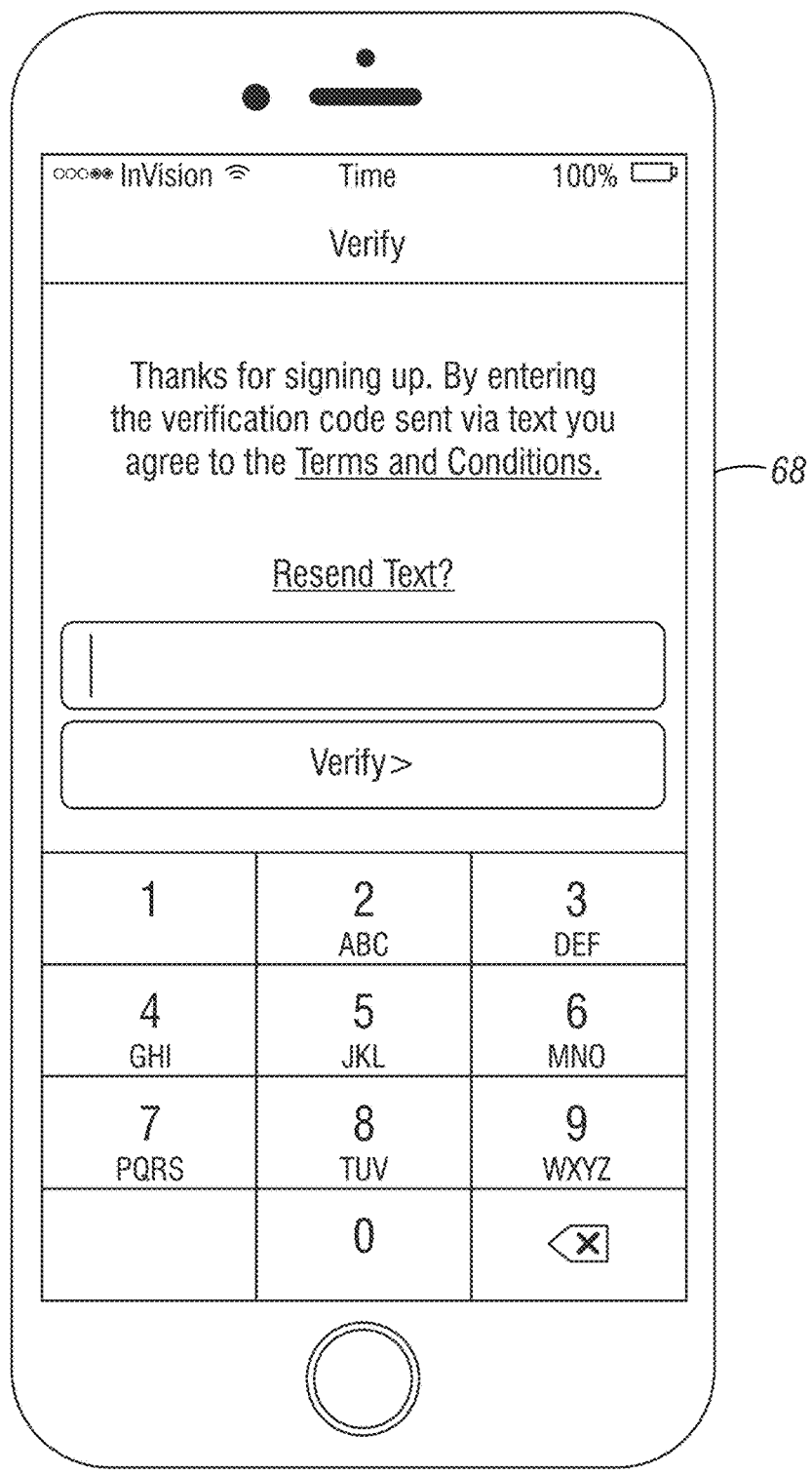
FIG. 9 is an exemplary view illustrating the mobile authentication process.

An advising company license code may be used and sent organization wide via LinkedIn to activate. Alternatively, multi-factor authentication may be used to confirm text activations. The text activation typically includes a 4 digit text code that is time bound to the device. Additionally, the mobile authentication process 68 does not require a password to remember, enhances security, and allows the mobile phone to act as the primary identity. Activations typically require a brief acceptance of the terms and conditions of the application and creation of an active user license. FIG. 9 illustrates the mobile authentication process 68. The active users will provide a data point for license offerings, allowing a certain number of unique users per year. Advisors are required to add their cell phone, zip code, and skill backup and corporate AD alias to attributes, thereby (1) enabling corporate AD alias to be federated with an organization's existing service desk or ticketing via API; (2) enabling a corporate federation synch to de-provision company association; and (3) providing the ability to associate a corporate AD alias to an actual case for quality of resource reporting. These attributes may be hidden from a public LinkedIn profile by storing in AzureAD.

Self-signup is permitted via a website dedicated to aiding customers in creating their own user profiles, typically by signing in with a mobile phone number and social profile. Alternatively, multi-factor authentication may be used to confirm text activations. The process requires email, cell phone, and zip code attributes.

Figure 10:
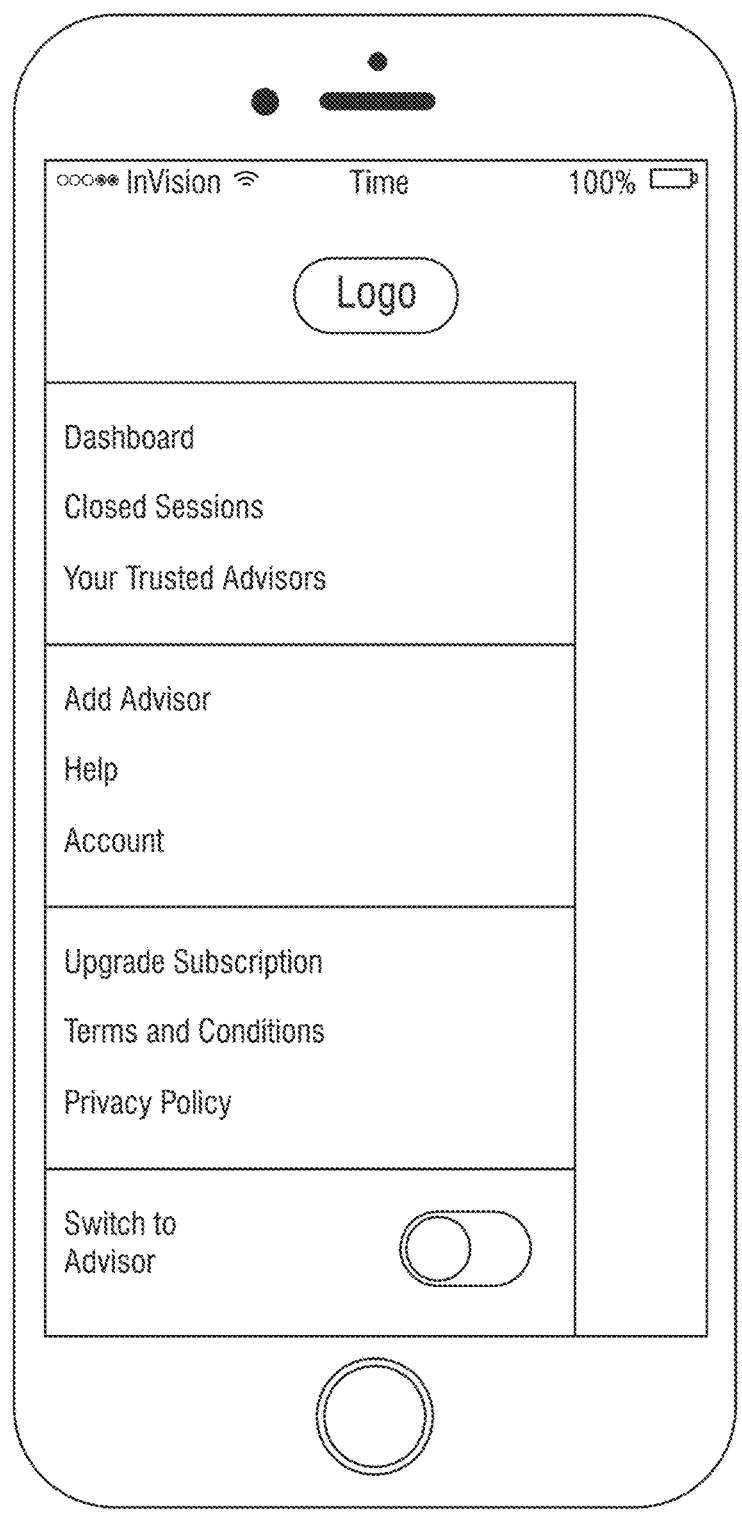
FIG. 10 is an exemplary view illustrating a user's ability to manage his or her account.

Once activated, a user may manage their account by viewing past support issues, getting support from the provider, and editing their profile. FIG. 10 illustrates a user's ability to manage his or her account.

Figure 11:
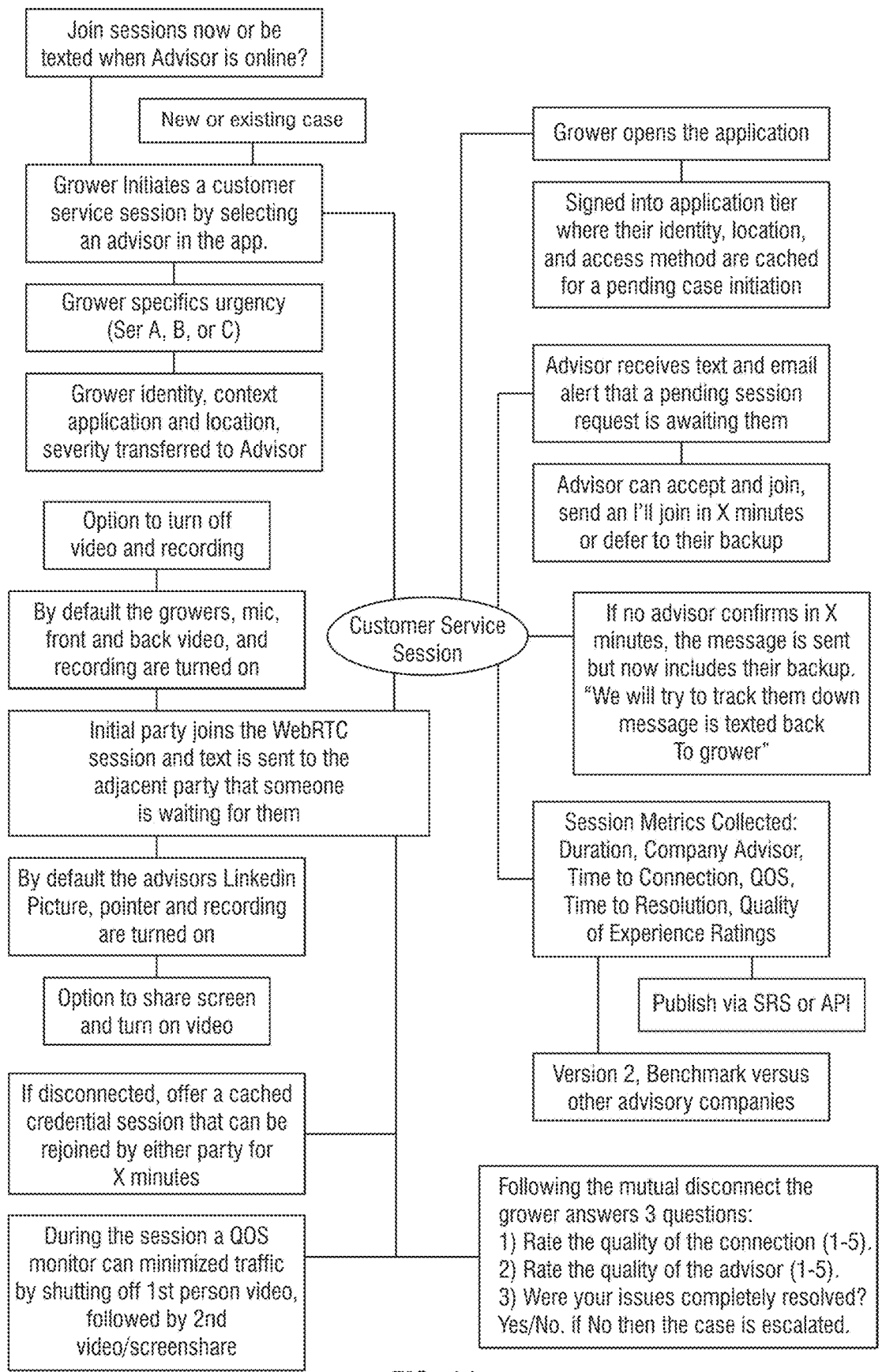
FIG. 11 is a high-level diagram illustrating the customer service session workflow.

FIG. 11 shows there are several different aspects to a customer service session in more detail.

For example, a customer may initiate a customer service session by selecting an advisor in the application. The customer may then select whether the problem is one of a new or existing case, specify the urgency of the issue, and whether the customer would like to join a live session or receive a text when the advisor is online. The customer identity, location, and severity are then transferred to the advisor as soon as an advisor is available.

Figure 12:
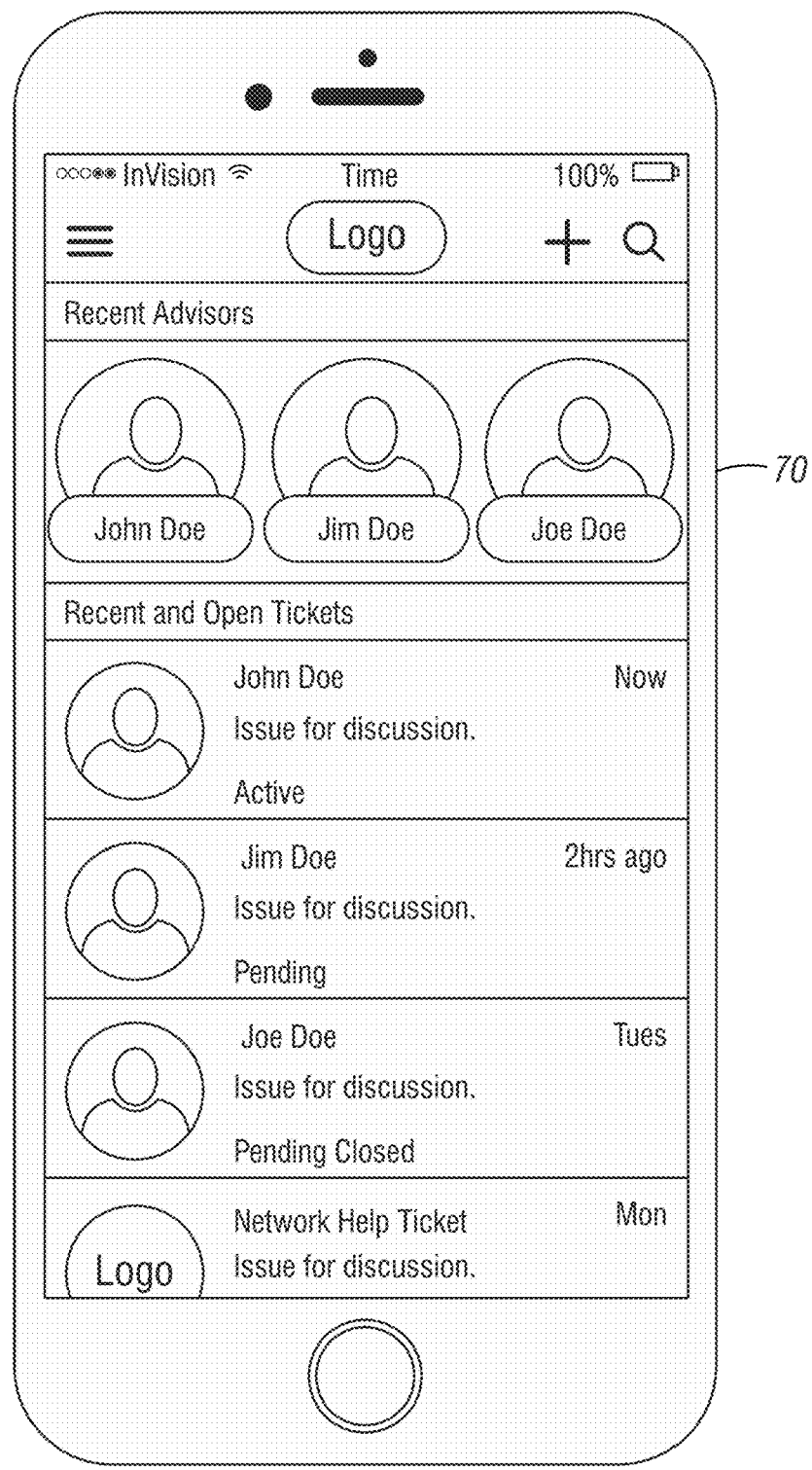
FIG. 12 is an exemplary view illustrating a customer dashboard.

According to another aspect of a customer service session, a customer may open the application and sign into the application tier where their identity, location, and access method are cached for a pending case initiation. The customer may access a customer dashboard 70 which allows the customer to manage service accounts, check the status and workflow of tickets, and request support on a new issue. FIG. 12 is an exemplary view of a customer dashboard 70.

Figure 13:
FIG. 13 is an exemplary view illustrating a customer opening a new support ticket.
Figure 14:
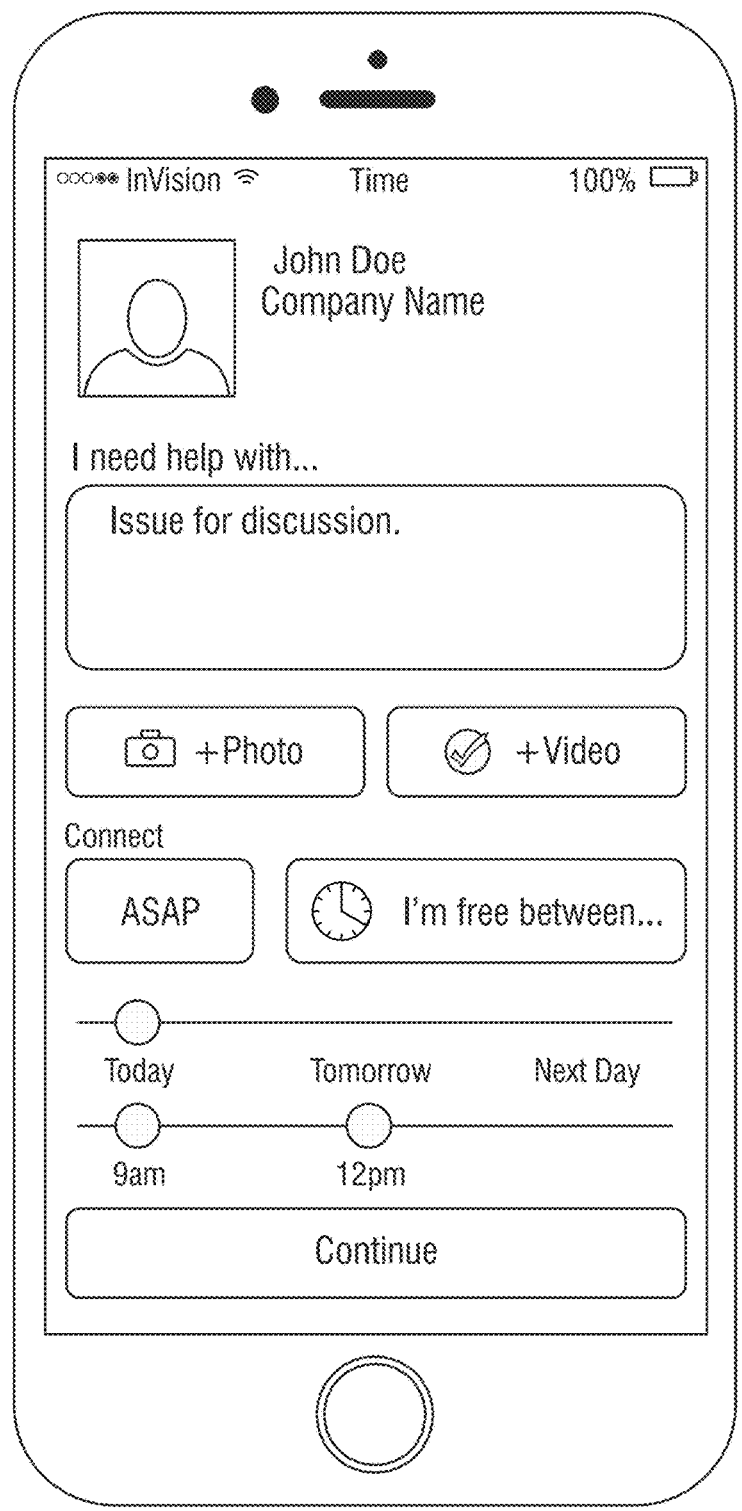
FIG. 14 is an exemplary view illustrating the ability of a customer to propose a time to connect with an advisor when creating a support ticket.
Figure 15:
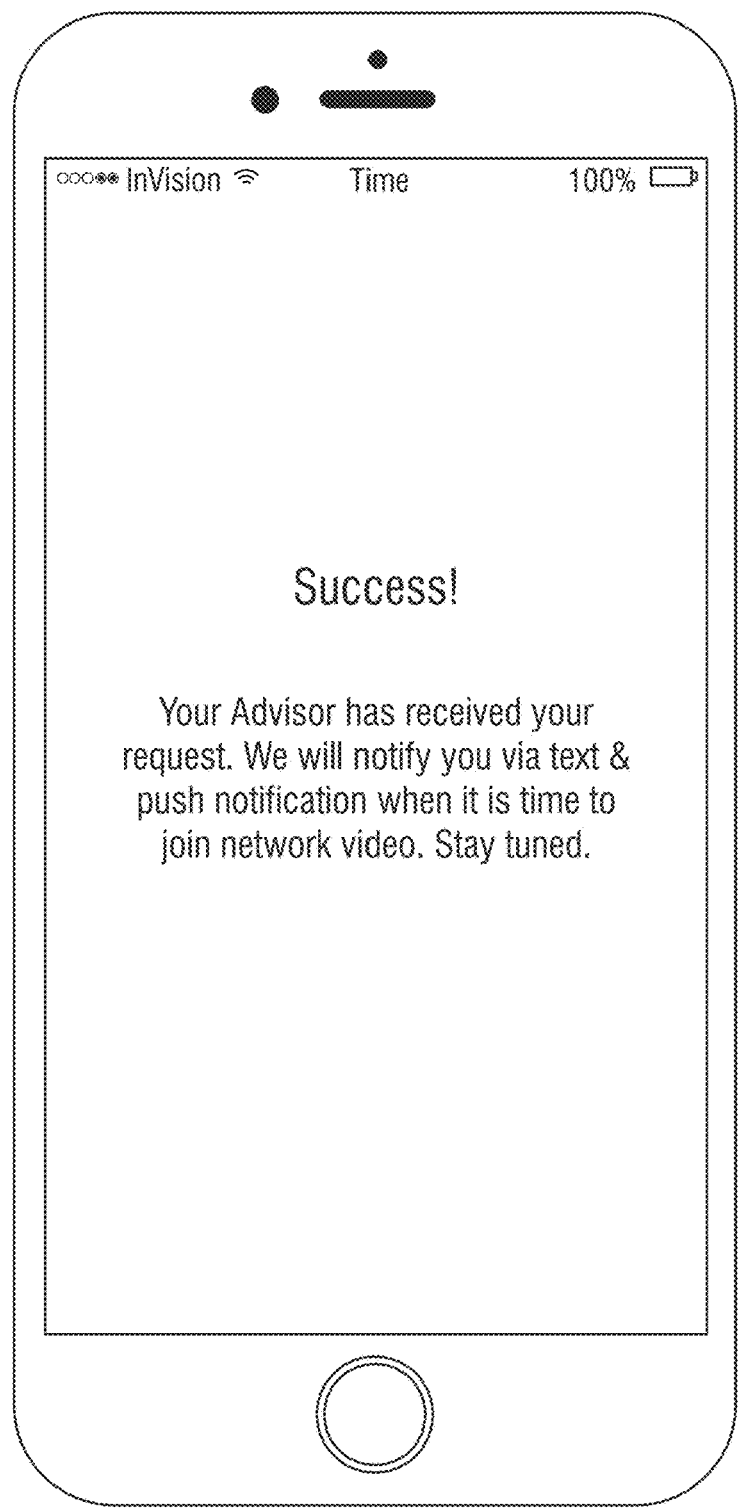
FIG. 15 is an exemplary view illustrating a confirmation message sent to a customer upon an advisor receiving the customer's request for a customer service session.

When creating a support ticket request, the customer may describe the issue by typing or using speech to text recognition. The customer may also add a photo or a brief video message to a support ticket. The customer may also schedule a support time or mark the ticket as urgent. FIG. 13 is an exemplary view of a customer creating a support ticket. FIG. 14 illustrates the ability for a customer to propose a time to connect with an advisor when creating a support ticket. Once a customer has created a new support ticket, a text notification is sent to a team of advisors indicating that the customer needs assistance. An advisor can connect live as soon as possible if the issue is urgent or can confirm a future time to connect. A confirmation message is sent to the customer when an advisor has received the request. FIG. 15 is an exemplary view of the confirmation message sent to the customer.

According to another aspect of a customer service session, an advisor may receive a text and email alert that a pending session request is awaiting them. The advisor may then accept and join, send an "I'll join in X minutes" message, or defer to their backup.

According to another aspect of a customer service session, if no advisor confirms the ticket status is unassigned to a team of advisors.

Figure 16:
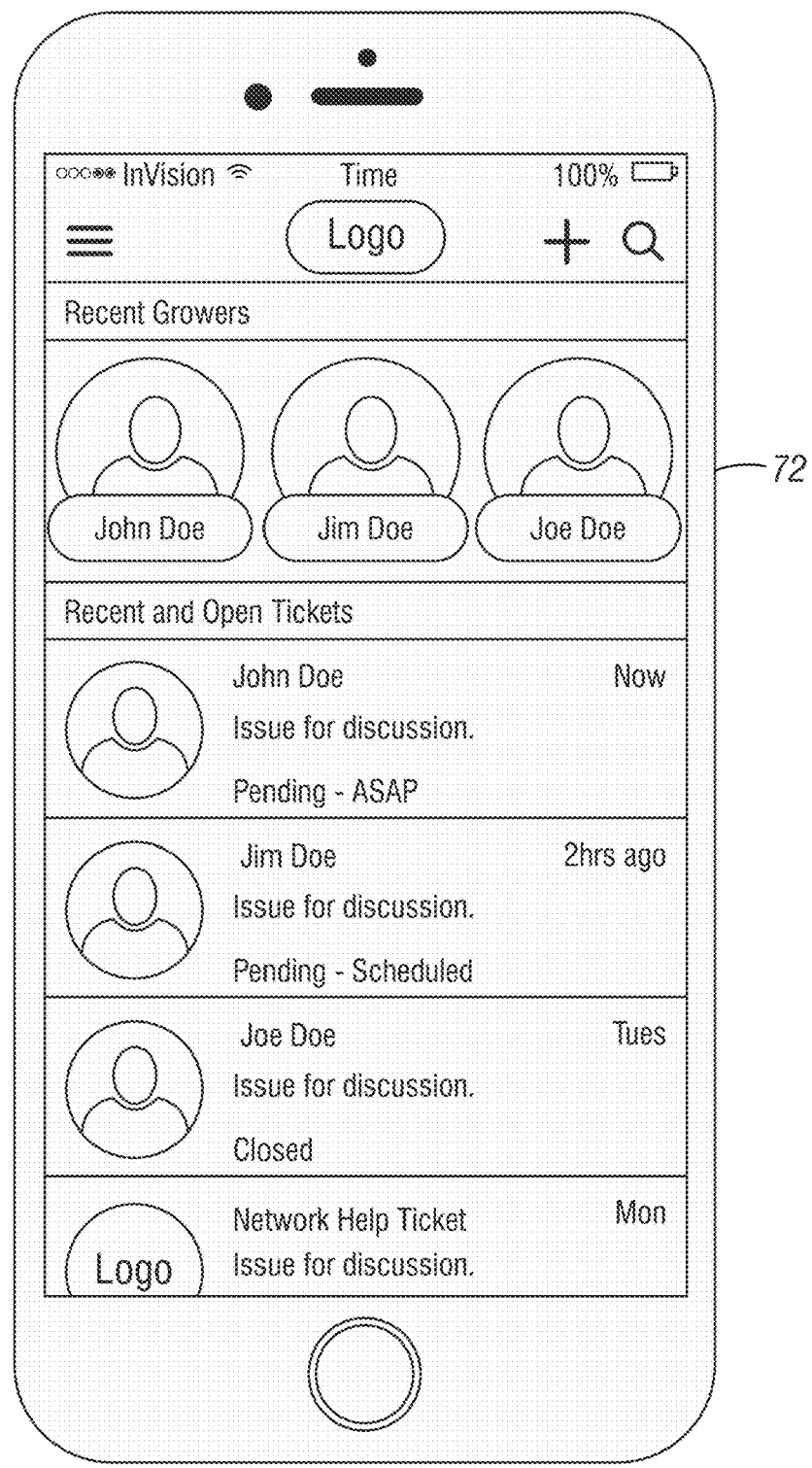
FIG. 16 is an exemplary view illustrating an advisor dashboard.
Figure 17:
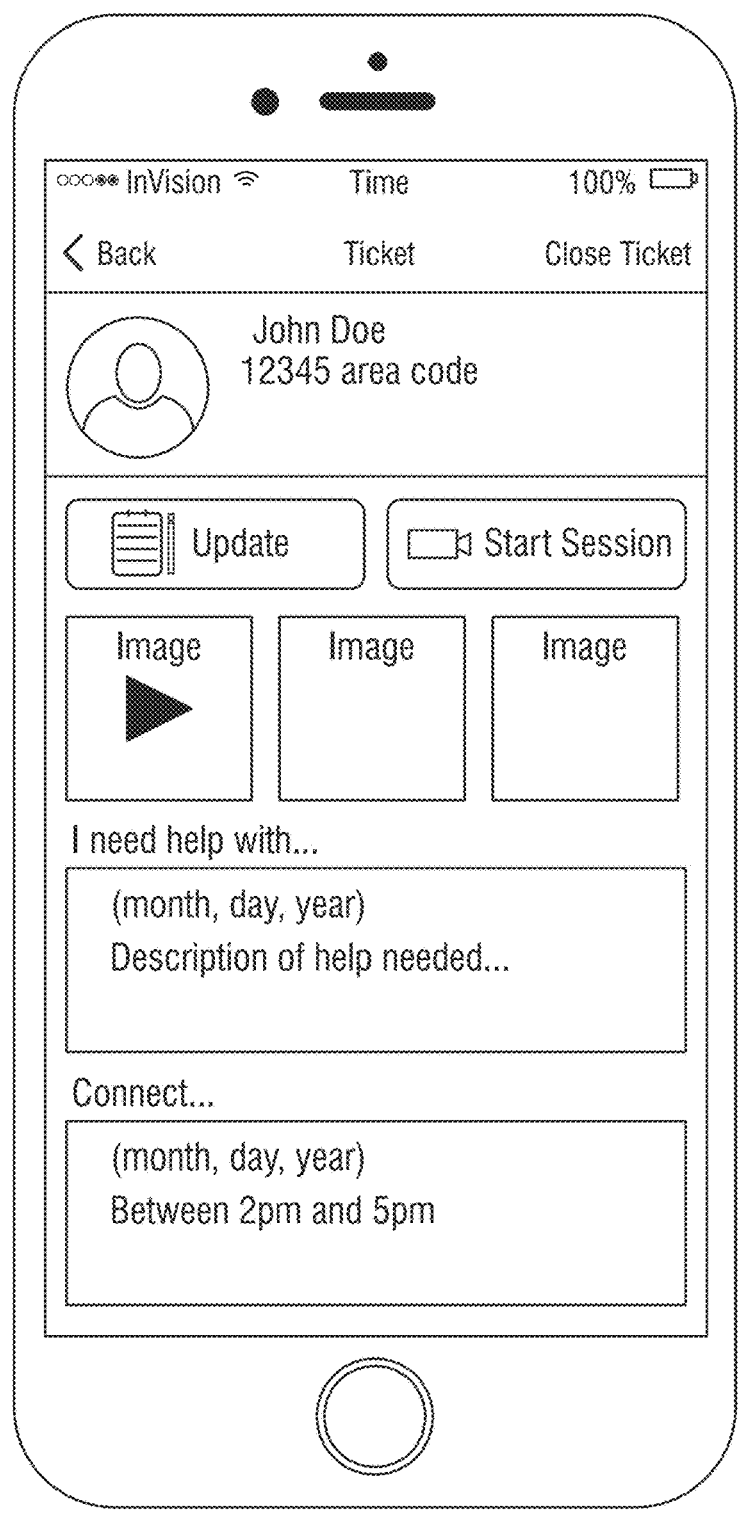
FIG. 17 is an exemplary view illustrating support ticket details.

Advisors may access an advisor dashboard 72 that allows the advisor to see service alerts, view open tickets with customers, re-assign tickets to team members, and view open tickets with advisors from inside or outside of the advisor's company. FIG. 16 is an exemplary view of an advisor dashboard 72. Advisors may view ticket details, which include pictures, videos, and ticket notes of the customer's issues. The ticket may also be updated with pictures and videos from the advisor. FIG. 17 illustrates an advisor's ability to view and update support tickets.

Figure 18:
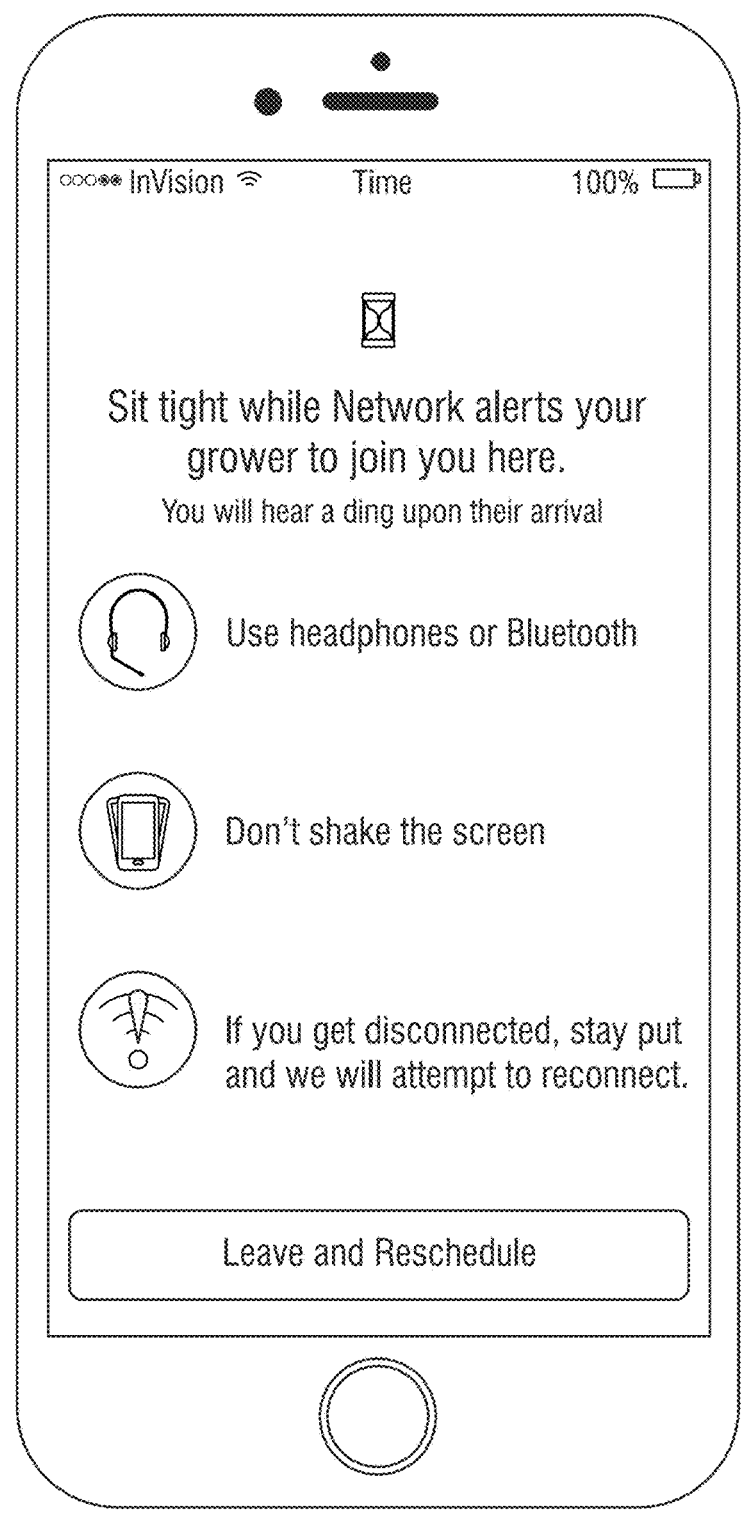
FIG. 18 is an exemplary view of a notification at the start of a live customer service session.
Figure 19:
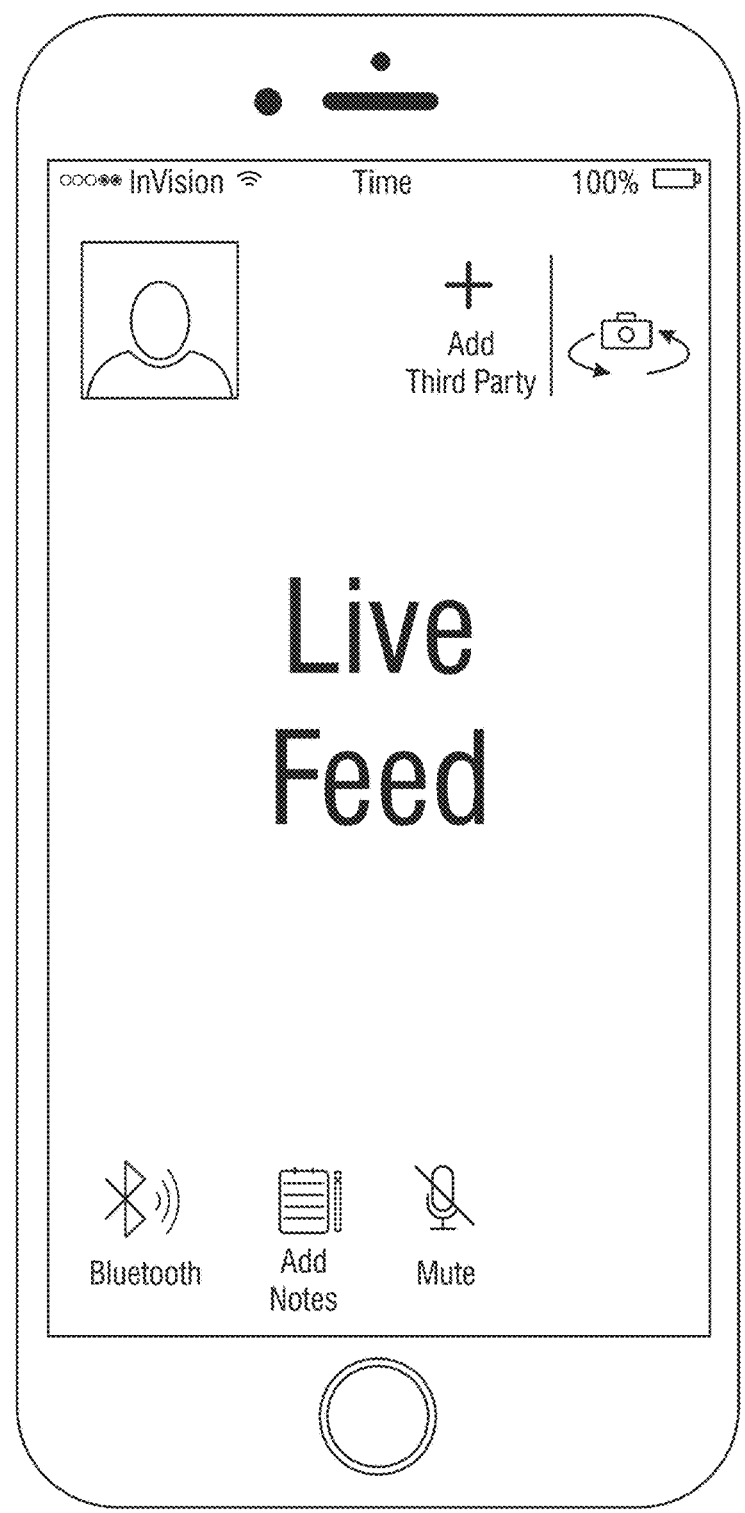
FIG. 19 is an exemplary view illustrating a live customer service session.

As an alternative, the advisor may start a live video support session with the customer. The notification at the start of a live support session gives the ability to leave and reschedule, utilizes cloud based signaling to connect the customer and the advisor, and includes tips for best practices regarding a live session. FIG. 18 is an exemplary view of a notification of a live session. The customer and advisor are able to see real time video and audio during live sessions, validate diagnoses, and view troubleshooting issues. FIG. 19 is an exemplary view of a live customer service session. The advisor has the ability to see what the customer sees. The ability to capture live screenshots is available during live video sessions. Live screenshots are automatically added to service tickets, can be referenced later in ticket history, and can be shared with a team.

Figure 20:
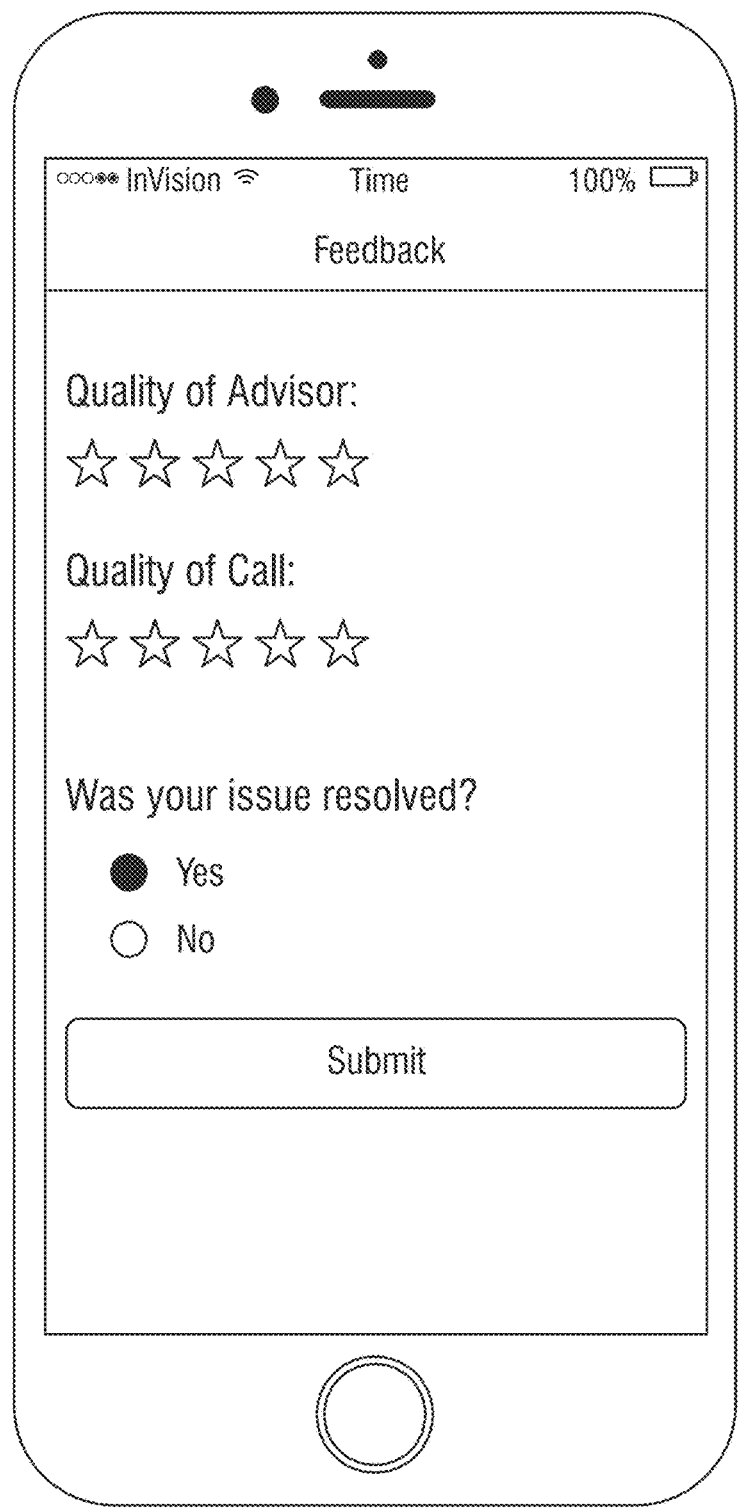
FIG. 20 is an exemplary view illustrating a customer's ability to provide feedback following a customer service session.
Figure 21:
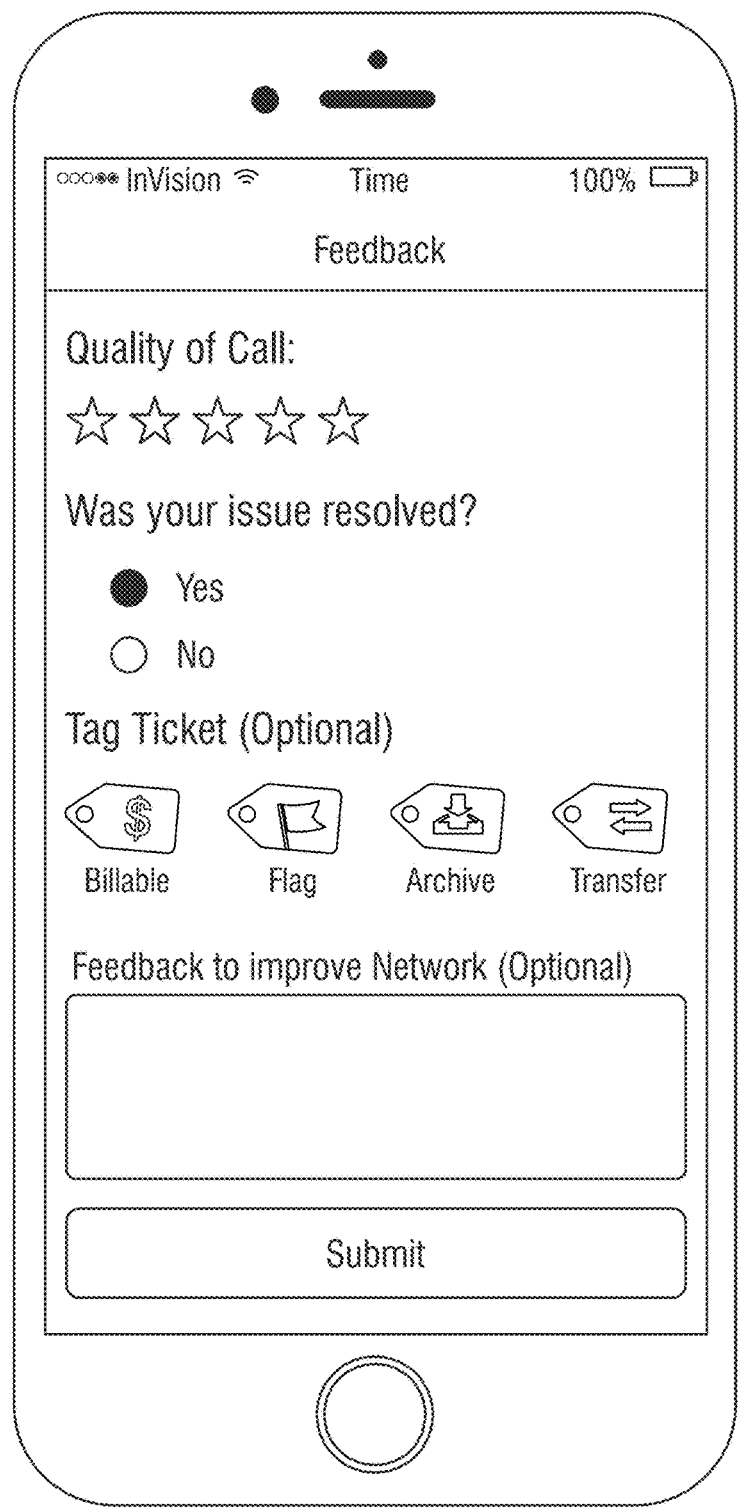
FIG. 21 is an exemplary view illustrating an advisor's ability to provide feedback following a customer service session.

After the live support session concludes, the customer feedback rating and satisfaction rating are texted immediately to the advisor. Additionally, advisors can rate the quality of the call and the quality of the service (QOS) as well as send a confirmation that the issue was resolved. FIG. 20 is an exemplary view of a customer's ability to provide feedback following a customer service session. Advisors can also provide feedback following a customer service session. Advisors can rate the quality of the call, confirm that the issue was resolved, and have an option to tag the call. Tagging a call means attaching a certain property to a call, such as marking it as billable, flagging it, archiving it, or transferring it. FIG. 21 illustrates an advisor's ability to provide feedback following a customer service session. Additionally, session metrics are collected following a customer service session. Session metrics may include some or all of, but are not limited to, the following: the duration, company advisor, time to connection, QOS, time to resolution, and quality of experience ratings. These metrics may publish via SRS or API. Benchmark metrics may be compared versus other advisor companies.

According to another aspect of a customer service session, an initial party can join a Video session and a text is sent to the adjacent party that someone is waiting for them. By default, the customer's microphone, front and back video, and recording are turned on and there is an option to turn off the video and recording. By default the advisor's social profile photo, pointer, and recording are turned on and there is an option to share the screen and turn on video. During the session a QOS monitor can minimize traffic by shutting off first person video, and then shut off video screensharing. If disconnected, a cached credential session that can be rejoined by either party for a certain amount of time can be offered. Finally, following a mutual disconnect the customer may be surveyed and asked to (1) rate the quality of the connection from one to five; (2) rate the quality of the advisor from one to five; and (3) indicate whether the customer's issues were completely resolved. If the customer's issues were not completely resolved the case is escalated.

Furthermore, the application may allow the customer to find an advisor based upon their service category and proximity to the customer and to store and/or save recent or trusted advisors that they have recently communicated with. This information may be displayed on the user's computing device. For example, the recently contacted advisors may be displayed on the screen of the user's smart phone or tablet and allow the user to contact the advisor directly by selecting the advisor. When a user or customer requests an advisor, the advisor may receive a notice of the request that the customer needs assistance. If the matter is urgent, the advisor may respond immediately. Alternatively, the advisor may confirm a time when the advisor will be able to contact the customer in the future. The user may also be able to review and/or manage past communications with advisors. For example, the user or customer may be able to review past information provided by an advisor related to a particular request from the customer.

Figure 22:
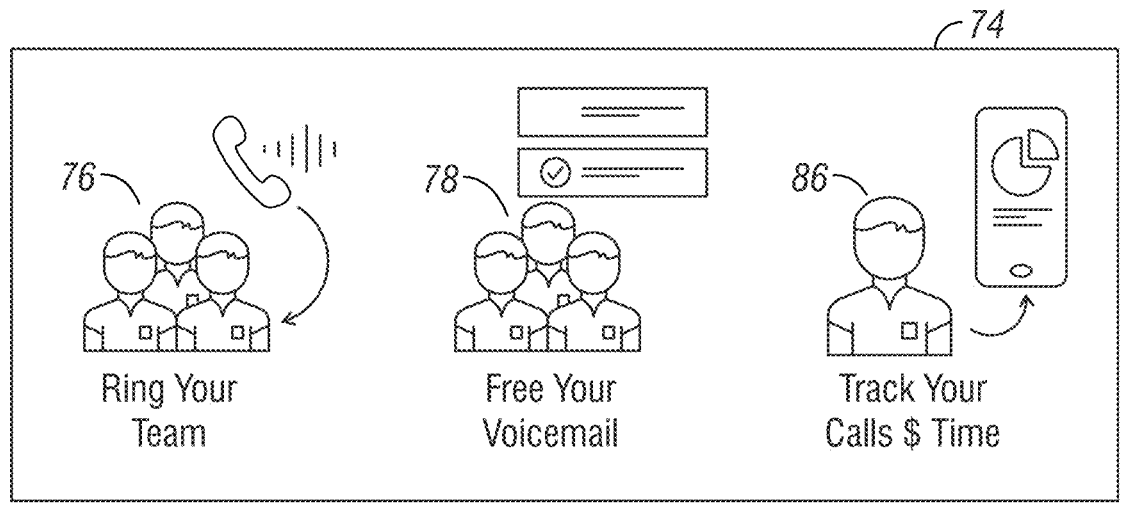
FIG. 22 is an abstract view illustrating the telecommunications system.

FIG. 22 illustrates a high-level view of the telecommunications system 74. The telecommunications system 74 provides the ability for customizable communication between customers and advisors in a variety of ways. The telecommunications system, along with the computer network, provides voice calling 76, allows for voicemail 78 submission and application, provides text message alerts 80, and provides call tracking 86. Additionally, advisor managers can create an advisor team, create a custom greeting 82 for a team, create a custom ring schedule 84 for a team, and share a new team phone number via text message. These features create flexibility for advisor teams in communicating with customers in a cost-effective and user-friendly way that does not require any hardware installation or IT help.

FIG. 23 shows the ability for an advisor manager to create a team of advisors. Creating a team of advisors is an effective way to spread the workload among advisors and increase responsiveness to customers' requests. Advisor managers can choose a predefined team name or enter a custom team name, and then can add advisors to the team. Advisor managers can then make the telecommunications system available for the team. When an advisor manager makes the telecommunications system available for the team, the computer network will provision a local phone number that then acts as the phone number for that team, or a call can be redirected to the telecommunications system via a 1-800 number associated with the team or a company. A customer can then call the phone number associated with the team, and the call will be forwarded to all active advisors who are part of the team by using voice to ticket 76. Team creation is available on a company dashboard 88. FIG. 24 is an exemplary view of a company dashboard 88.

Figure 25:
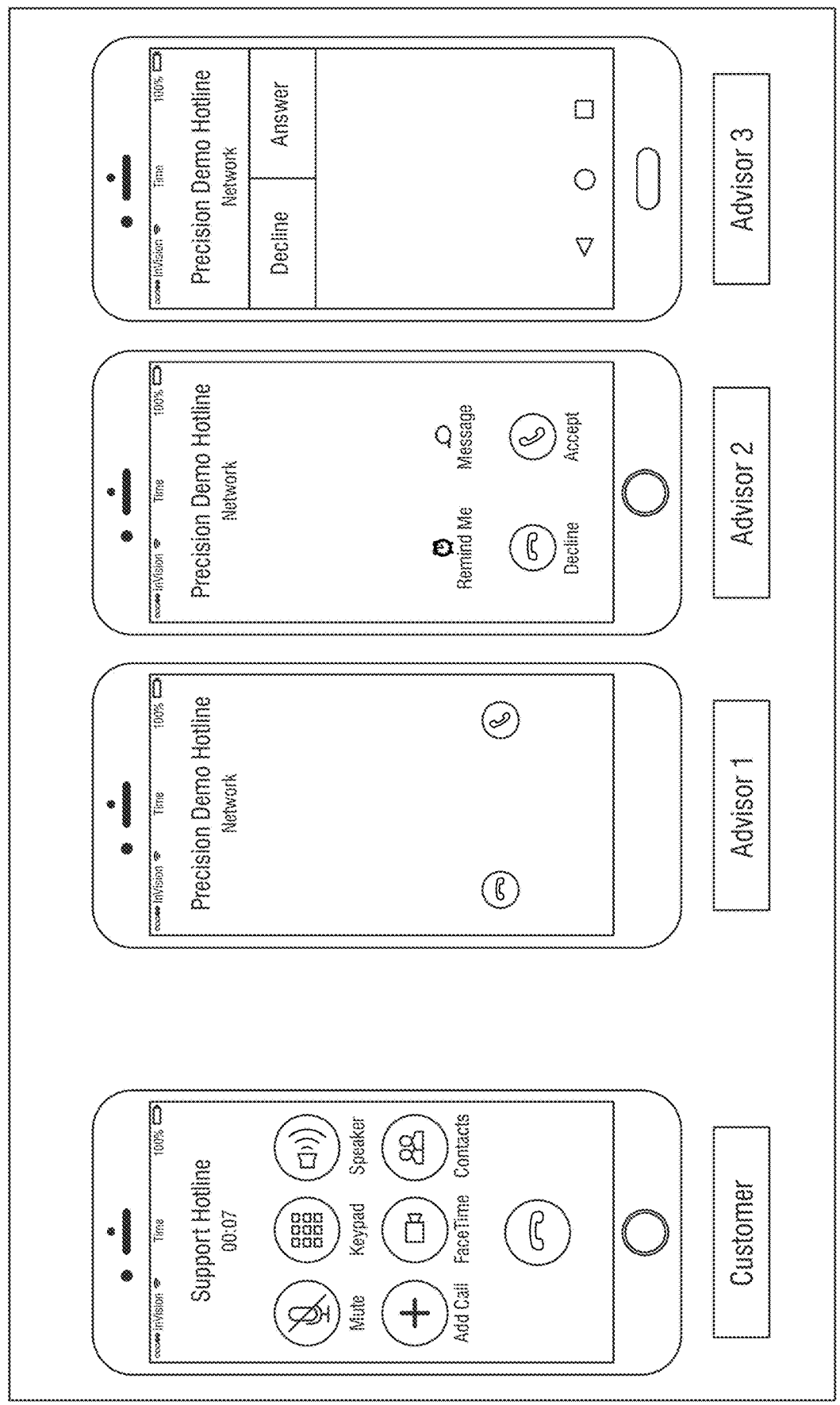
FIG. 25 is real-time view illustrating the voice to ticket feature.

FIG. 25 shows an example of the voice call 76 feature operating in real-time. Simultaneous team ring 76 allows a customer to make a single phone call to a phone number associated with a team, and the call is forwarded to all active members of the team simultaneously. This allows for advisor mobility because the simultaneous ring feature 76 is completely mobile, and therefore advisors do not need to all be located in a single location. If none of the team members answer the call, the customer is able to leave a voice ticket 78. When a customer submits a voice ticket 78, it is stored in a team-wide mailbox instead of in each advisor's personal mailbox. The voiceticket 78 then interacts seamlessly with the computer network to automatically create a support ticket. Customers and advisors can then view that support ticket in their respective dashboards. A text message alert 80 is then automatically sent to the customer who made the call and the advisors who are members of the team that was called.

Figure 26:
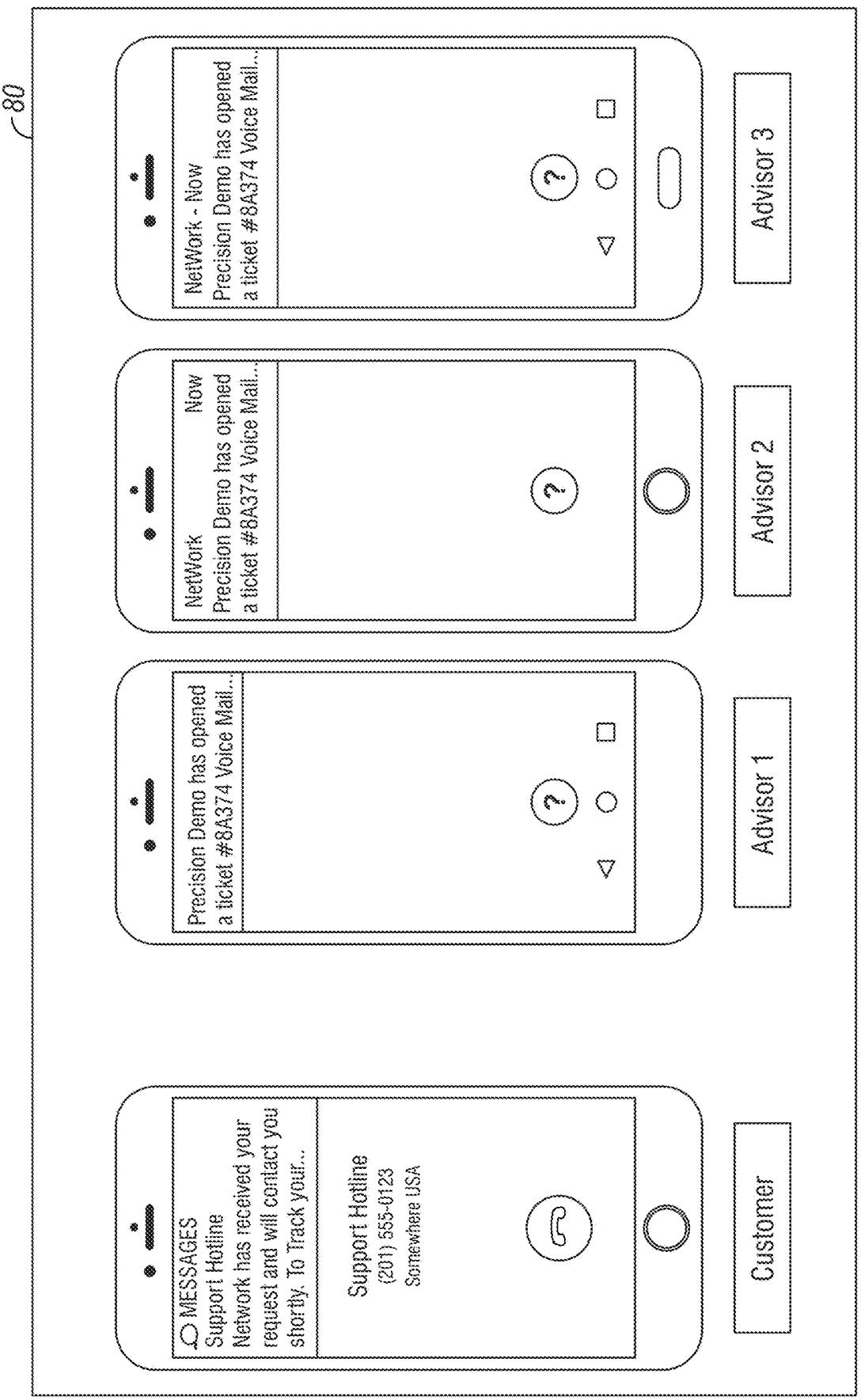
FIG. 26 is a real-time view illustrating text message alerts delivered following a voicemail submission.

FIG. 26 shows a real-time view of text message alerts 80 sent to a customer and advisor members of the team that the customer called after the customer has submitted a voicemail. The text message alert 80 sent to the customer alerts the customer that the voicemail has been received and a support ticket has been created. The text message alert 80 sent to the advisors who are members of the team alerts them that a support ticket has been created.

Figure 27:
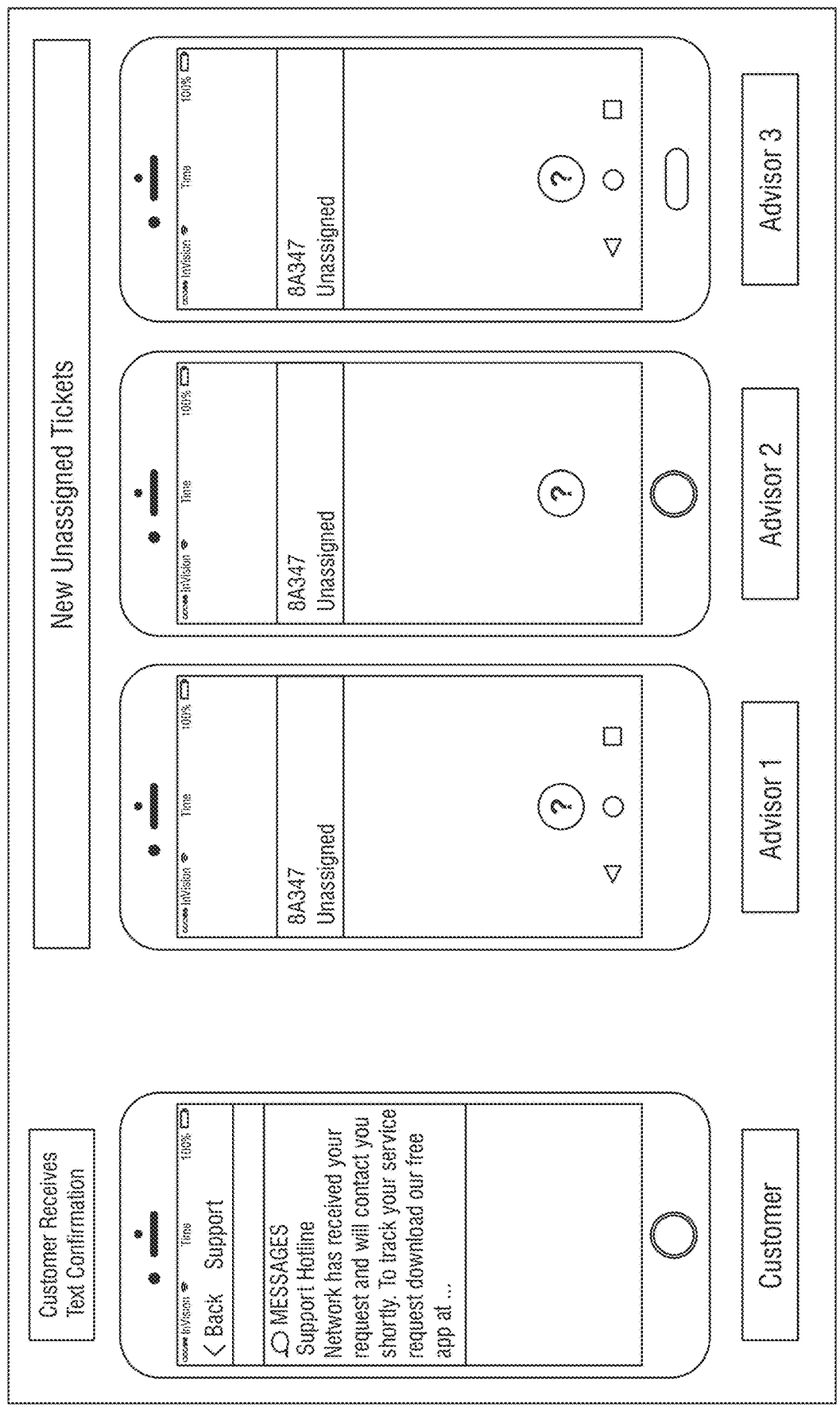
FIG. 27 is a real-time view illustrating how a voicemail submission interacts with the computer network to create a support ticket.

FIG. 27 shows a real-time view of an unassigned support ticket available to advisors of a particular team after a customer has left a voicemail 78 for that team as well as the text message alert 80 sent to the customer.

Communication between customers and advisors is further customizable. FIG. 28 shows the ability for advisor managers to create a custom greeting 82 for an advisor team. Three different custom greetings can be created: a "Welcome" greeting, a "Leave Message" greeting, and an "After Hours" greeting. A generic greeting is automatically provided, but advisor managers have the ability to record a custom greeting 82.

FIG. 29 shows the ability for advisor managers to create a custom ring schedule 84. The custom ring schedule 84, allows an advisor manager to select which times of day certain advisors from the team will receive a call when a customer calls the team phone number. An advisor manager can select certain advisors to receive a call during business hours Monday through Friday, during evening hours Monday through Friday, on Saturdays, and on Sundays. Further, the business hours, evening hours, Saturday hours, and Sunday hours can be modified by the advisor manager. The advisor manager also has the ability to turn the custom ring schedules 84 on or off. When the custom ring schedules 84 are turned off, the default is that all advisors in the team will be called whenever a customer calls the team phone number.

Figure 30:
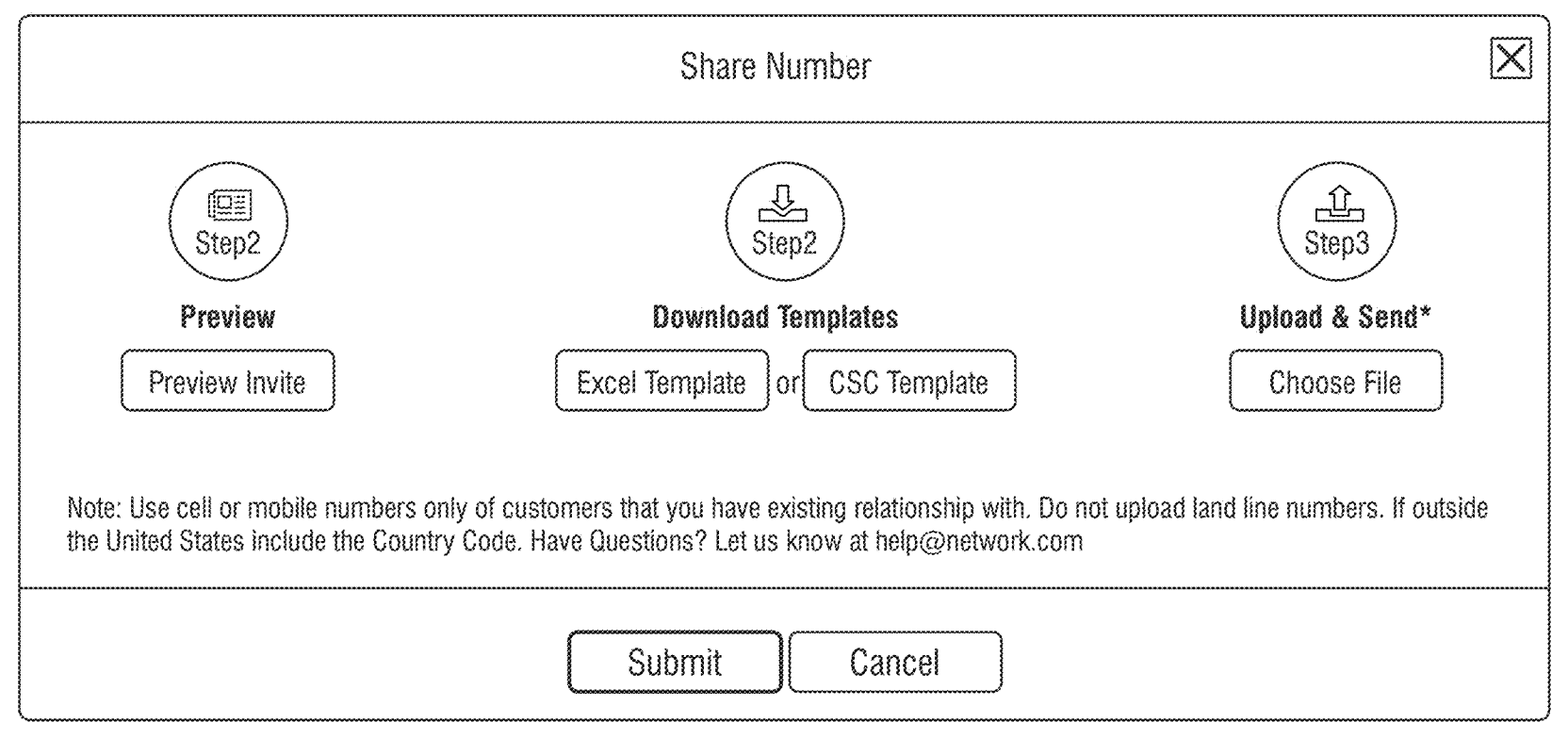
Figure 31:
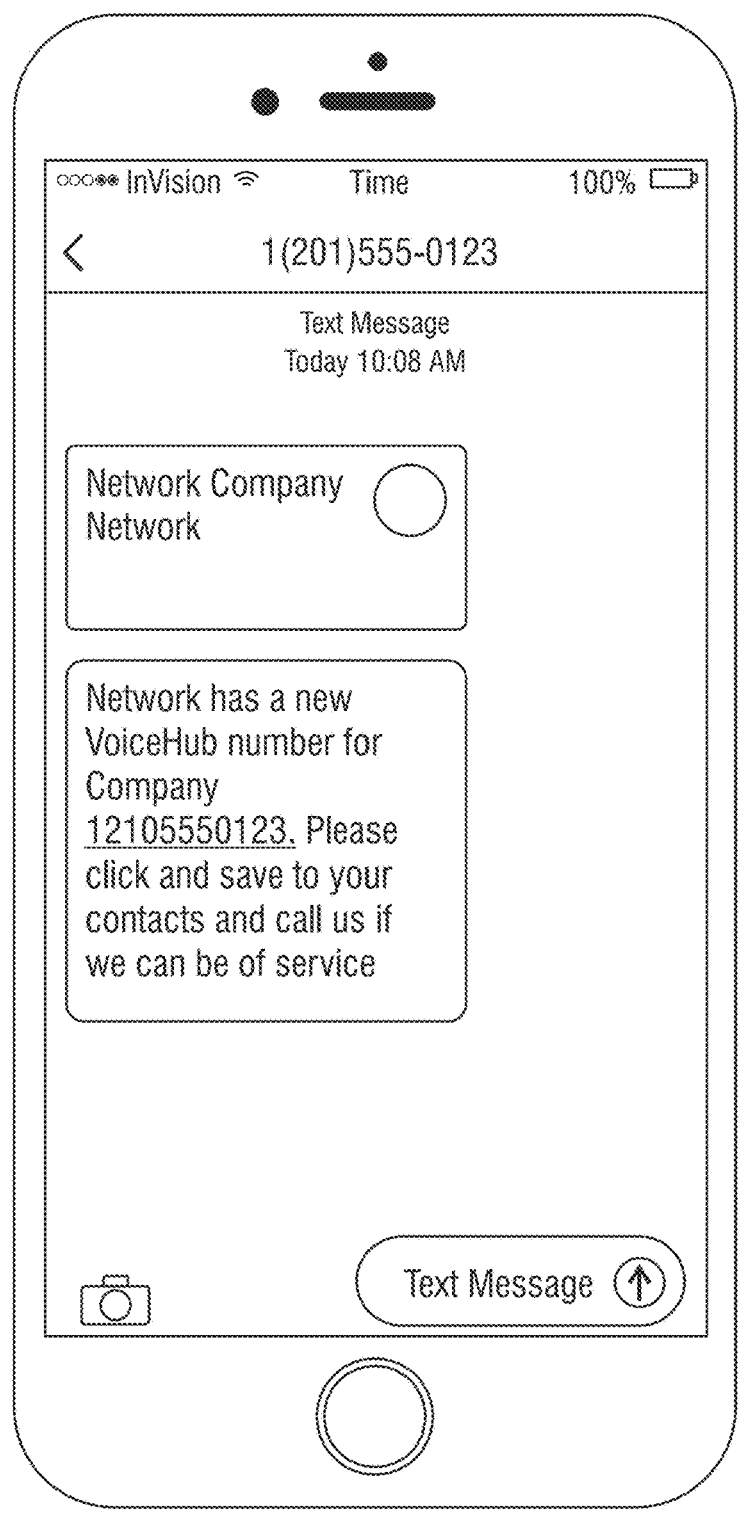
FIG. 31 is a real-time view showing a received text message regarding a change to the team phone number.

FIG. 30 shows the ability for advisor managers to share the team phone number with customers via text message. Advisor managers first have the ability to preview the text message to be sent to customers, which contains a company name, the team name, and the new team phone number. Advisor managers can then choose to share the team phone number by downloading an Excel or CSV template and entering customers' names and phone numbers into the template. Advisor managers then upload the completed Excel or CSV spreadsheet and choose to submit it to send a text to all customers included in the spreadsheet. All customers included in the uploaded spreadsheet will simultaneously receive a text informing them of the new number along with a contact card that can be saved to their phone. FIG. 31 shows the text that a customer would receive indicating that the team phone number has been changed.

The ability to create a custom greeting 82, the ability to create a custom ring schedule 84, and the ability to share a team phone number are all available on the company dashboard 88. In addition to being able to create teams, create custom greetings 82, create custom ring schedules 84, and share a team phone number from the company dashboard 88, advisor managers can view created teams, managers, advisors, and dashboard users from the company dashboard 88. Advisor managers can also invite internal advisors to join the company dashboard 88. Additionally, the company dashboard 88 allows an advisor or advisor manager to track tickets and feedback from customers, view ticket details, export ticket details in a spreadsheet format, perform actions on tickets such as re-assigning or escalating a ticket to a new advisor as well as initiating a customer service session complete with video and audio. Advisors and advisor managers can also manage the brand, profile, and subscription for a company from the company dashboard 88. The company dashboard 88 is viewable via a browser. The customer dashboard 70 and advisor dashboard 72 are also both viewable in a browser in addition to the mobile application interface 52. To view the customer dashboard 70 or advisor dashboard 72 via a browser instead of the mobile application interface 52, a user must use mobile phone authentication. FIG. 32 illustrates mobile phone authentication when a user logs into a browser.

The telecommunications system 74 also provides a call tracking 86 feature. The telecommunications system 74 sends text message alerts 80 to customers and advisors, and also enables customers and advisors to view support tickets in their respective dashboards after they are created by leaving a voicemail. Additionally, the telecommunication system 74 automatically provides call tracking 86 information to advisors via a spreadsheet and ticket API. When an advisor responds to a voicemail, or support ticket, a spreadsheet of call tracking 86 information is automatically provided including information such as ticket number, status, call duration, client name, date, and other information about the ticket. FIG. 33 shows an example of a spreadsheet containing call tracking 86 information.

Therefore, the present invention enables live support and engagement vertically within the field service industry. Technology providers can deliver better support and knowledge to their customer customers, increasing customer satisfaction and goodwill. Customers are provided with single door access to multiple field-centric business sectors through a directory of advisors. The invention works across multiple devices. It permits customers to easily seek a second opinion outside of the branded option. Multiple applications and products can be supported through a single support interface.

While the present disclosure focuses on development using web and video, and voice API, and secure REST services using global cloud providers that service multiple browsers and mobile end points, it is contemplated aspects of the present disclosure may be used with waterfall development using an alternative real time collaboration service in a private or alternative public cloud. In addition, this could be designed to focus on either a proprietary endpoint or a subset of mobile endpoints and browsers.

Some embodiments include use of a satellite-based radio-navigation system such as the global positioning system ("GPS"). GPS is owned by the United States and uses satellites to provide geolocation information to a GPS receiver. GPS, and other satellite-based radio-navigation systems, can be used for location positioning, navigation, tracking, and mapping. In some embodiments, GPS is used.

The network could be, for example, a wide area network ("WAN"), a local area network ("LAN"), a neighborhood area network ("NAN"), a home area network ("HAN"), or personal area network ("PAN") employing any of a variety of communications protocols, such as Wi-Fi, Bluetooth, ZigBee, near field communication ("NFC"), etc., although other types of networks are possible and are contemplated herein. Communications through the network can be protected using one or more encryption techniques, such as those techniques provided in the IEEE 802.1 standard for port-based network security, pre-shared key, Extensible Authentication Protocol ("EAP"), Wired Equivalent Privacy ("WEP"), Temporal Key Integrity Protocol ("TKIP"), Wi-Fi Protected Access ("WPA"), and the like.

In some embodiments the computer network used for communication between devices is, by way of example only, a wide area network ("WAN"), such as a TCP/IP based network or a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a Digital Enhanced Cordless Telecommunications ("DECT") network, a Digital AMPS ("IS-136/TDMA") network, or an Integrated Digital Enhanced Network ("iDEN") network, etc.), although other network types are possible and contemplated herein.

In some embodiments a cloud-based network could be used. A software licensing and delivery model for a cloud-based network could be software as a service (SaaS), infrastructure as a service (IaaS), platform as a service (PaaS), desktop as a service (DaaS), a managed service provider, mobile backend as a service (MBaaS), or information technology management as a service (ITMaaS).

From the foregoing, it can be seen that the present invention accomplishes at least all of the stated objectives.

LIST OF REFERENCE NUMERALS

The following list of reference numerals is provided to facilitate an understanding and examination of the present disclosure and is not exhaustive. Provided it is possible to do so, elements identified by a numeral may be replaced or used in combination with any elements identified by a separate numeral. Additionally, numerals are not limited to the descriptors provided herein and include equivalent structures and other objects possessing the same function.

50 mobile device
52 mobile application interface
54 agricultural equipment, such as implements and sensors
56 crops
58 cloud-based software as a service model
60 communications
62 two types of profiles
64 tutorial
66 quick share
68 mobile authentication process
70 customer dashboard
72 advisor dashboard
74 telecommunications system
76 voice to ticket
78 voicemail
80 text message alert
82 custom greeting
84 custom ring schedule
86 call tracking
88 company dashboard The present disclosure is not to be limited to the particular embodiments described herein. The following claims set forth a number of the embodiments of the present disclosure with greater particularity.

The invention claimed is:

1. A method of connecting customers needing technological support with advisors capable of providing technological support, comprising:
receiving, from an advisor manager through an application, by at least one server computer, a selection of a plurality of advisors to be included in a team of advisors;
provisioning, by the at least one server computer, a team phone number for call routing to the advisors in the team of advisors in response to receiving the selection of the plurality of advisors to be included in the team of advisors;
creating, by the at least one server computer, a support ticket request based on a user selection input received from a customer through the application, wherein the user selection input identifies a requested advisor for the support ticket request from a database of registered advisors, wherein the database of registered advisors includes contact information and a listing of skills for each registered advisor;
notifying, by the at least one server computer, the requested advisor that the requested advisor has been selected by the customer;
forwarding, by the at least one server computer to the customer, the provisioned team phone number, wherein the team of advisors includes the requested advisor;
receiving an incoming phone call on the provisioned team phone number, wherein the incoming phone call is from the customer and related to the support ticket request;
automatically forwarding the incoming phone call to a phone number associated in the database with at least one advisor on the team of advisors for the support ticket request; and
adding, by the at least one server computer, an advisor to the database of registered advisors by an action selected from a group of actions consisting of:
inviting an advisor from the customer's list of contacts,
adding an advisor from a network directory of existing advisors based on service category and proximity, and
inviting an advisor by entering the advisor's mobile phone number.

2. The method of claim 1 further comprising:
adding, by the at least one server computer, video and photos to the support ticket request.

3. The method of claim 1 further comprising:
transmitting, by the at least one server computer, a request to the customer and advisor to provide feedback regarding the service session.

4. The method of claim 1 wherein the application includes a selection interface configured to aid the customers in selecting an advisor based on the advisor's service category, issues facing the customers, and the customers' proximity to the advisor.

5. The method of claim 1 further comprising: receiving, by the at least one server computer, a description of an issue needing to be resolved by an advisor relating to the support ticket request.

6. The method of claim 5 wherein the received description includes an indication of an urgency of the issue.

7. The method of claim 1 wherein the method is executed through a cloud-based software as a service (SaaS) model.

8. The method of claim 1 further comprising: transmitting, by the at least one server computer, audio and video communication between the customer and requested advisor relating to the support ticket request.

9. The method of claim 1 further comprising: recording, by the at least one server computer, communication between the customer and requested advisor relating to the support ticket request.

10. The method of claim 1 further comprising:
monitoring, by the at least one server computer, traffic of a communication interface between the customer and requested advisor according to a quality of service performance metric; and
minimizing, by the at least one server computer, the traffic of the communication interface by disabling transmission of one or more features associated with video data of the requested advisor during periods of high traffic.

11. The method of claim 1 further comprising:
creating, by the at least one server, a custom greeting for the team phone number via the application; and
playing, by the at least one server, the custom greeting in response to receiving an incoming call on the team phone number.

12. The method of claim 1 further comprising:
creating, by the at least one server, a ring schedule for the team advisors via the application, wherein the ring schedule identifies at least one advisor of the team of advisors for each of a plurality of periods of time; and forwarding, by the at least one server, the incoming phone call to the at least one advisor of the team advisors according to the ring schedule.

13. The method of claim 12 further comprising: receiving, by the at least one server computer from the requested advisor, an indication of one or more suggested times for real-time communication with the customer; and communicating, by the at least one server computer, the one or more suggested times to the customer.

14. The method of claim 1, wherein forwarding the provisioned team phone number to the customer includes sending, by the at least one server, a text message to the customer that includes the provisioned team phone number in response to creating the support ticket request.

15. A method of connecting customers needing technological support with advisors capable of providing technological support, comprising:

receiving, from an advisor manager through an application, by at least one server computer, a selection of a plurality of advisors to be included in a team of advisors;

provisioning, by the at least one server computer, a team phone number for call routing to the advisors in the team of advisors in response to receiving the selection of the plurality of advisors to be included in the team of advisors;

creating, by the at least one server computer, a support ticket request based on a user selection input received from a customer through the application, wherein the user selection input identifies a requested advisor for the support ticket request from a database of registered advisors, wherein the database of registered advisors includes contact information and a listing of skills for each registered advisor;

notifying, by the at least one server computer, the requested advisor that the requested advisor has been selected by the customer;

forwarding, by the at least one server computer to the customer, the provisioned team phone number, wherein the team of advisors includes the requested advisor;

receiving an incoming phone call on the provisioned team phone number, wherein the incoming phone call is from the customer and related to the support ticket request automatically forwarding the incoming phone call to a phone number associated in the database with at least one advisor on the team of advisors for the support ticket request;

receiving, from the customer, an incoming call to the provisioned team phone number;

recording a voice ticket from the customer in response to the call forwarded to the created team not being answered, and automatically creating, by the at least one server computer, a new support ticket request based on the voice ticket.

16. The method of claim 15, further comprising providing, via the application, a selection interface configured to aid the customer in selecting an advisor based on the advisor's service category, issues facing the customer, and the customer's proximity to the advisor.

17. The method of claim 15, further comprising recording, by the at least one server computer, communications between the customer and the requested advisor relating to the support ticket request.

18. The method of claim 15, further comprising:

monitoring, by the at least one server computer, traffic of a communication interface between the customer and requested advisor according to a quality of service performance metric; and minimizing, by the at least one server computer, the traffic of the communication interface by disabling transmission of one or more features associated with video data of the requested advisor during periods of high traffic.

19. The method of claim 15, further comprising:

creating, by the at least one server, a ring schedule for the team advisors via the application, wherein the ring schedule identifies at least one advisor of the team of advisors for each of a plurality of periods of time; and forwarding, by the at least one server, the incoming phone call to the at least one advisor of the team advisors according to the ring schedule.

20. The method of claim 19, further comprising:

receiving, by the at least one server computer from the requested advisor, an indication of one or more suggested times for real-time communication with the customer; and communicating, by the at least one server computer, the one or more suggested times to the customer.

* * * * *